United States Patent
Rubin et al.

(10) Patent No.: US 9,552,727 B2
(45) Date of Patent: Jan. 24, 2017

(54) V2V SYSTEM WITH A HYBRID PHYSICAL LAYER

(71) Applicants: Kim Rubin, Menlo Park, CA (US); Joe Betts-Lacroix, Belmont, CA (US)

(72) Inventors: Kim Rubin, Menlo Park, CA (US); Joe Betts-Lacroix, Belmont, CA (US)

(73) Assignee: Zetta Research and Development LLC—ForC Series, Wilmington, DE (US)

( * ) Notice: Subject to any disclaimer, the term of this patent is extended or adjusted under 35 U.S.C. 154(b) by 305 days.

(21) Appl. No.: 14/395,753

(22) PCT Filed: Apr. 23, 2013

(86) PCT No.: PCT/US2013/037847
§ 371 (c)(1),
(2) Date: Oct. 20, 2014

(87) PCT Pub. No.: WO2013/163218
PCT Pub. Date: Oct. 31, 2013

(65) Prior Publication Data
US 2015/0131637 A1    May 14, 2015

Related U.S. Application Data

(60) Provisional application No. 61/637,588, filed on Apr. 24, 2012.

(51) Int. Cl.
*H04W 4/06* (2009.01)
*G08G 1/0967* (2006.01)
(Continued)

(52) U.S. Cl.
CPC ......... *G08G 1/096791* (2013.01); *G01C 21/26* (2013.01); *G01C 21/3658* (2013.01);
(Continued)

(58) Field of Classification Search
None
See application file for complete search history.

(56) References Cited

U.S. PATENT DOCUMENTS

| | | | | |
|---|---|---|---|---|
| 5,506,587 A | * | 4/1996 | Lans | G01S 5/0072 342/357.31 |
| 6,765,495 B1 | * | 7/2004 | Dunning | G08G 1/161 340/435 |

(Continued)

*Primary Examiner* — Hassan Phillips
*Assistant Examiner* — Gautam Sharma
(74) *Attorney, Agent, or Firm* — Kim Rubin Patent Agent

(57) ABSTRACT

A vehicle-to-vehicle (V2V) communication transponder for use in V2V communication, safety and anti-collision systems using a hybrid protocol combining time-division multiplexed access (TDMA), with collision sense multiple access (CSMA) protocol. The TDMA frame is broken into regions, a priority and emergency TDMA region, and a non-priority CSMA region. The sizes of the TDMA regions change dynamically based on demand, with the CSMA region using the remaining time slots. Transponders self-select time slots; selected slots are held until a new time slot selection criteria; all transponders participate in notifying a transponder of a time slot message collision. An inter-transmission guard time may be dynamic based on range. Embodiments are free of MAC and IP addresses. No central authority or road-side equipment (RSU) is required. Embodiments include equipped vehicles and V2V system using the transponder.

17 Claims, 10 Drawing Sheets

(51) Int. Cl.

| | | |
|---|---|---|
| *G08G 9/02* | (2006.01) | |
| *G08G 1/09* | (2006.01) | |
| *G08G 1/14* | (2006.01) | |
| *G08G 1/16* | (2006.01) | |
| *H04W 4/04* | (2009.01) | |
| *G01C 21/26* | (2006.01) | |
| *G01C 21/36* | (2006.01) | |
| *G08G 1/0969* | (2006.01) | |
| *H04J 3/16* | (2006.01) | |
| *H04L 5/00* | (2006.01) | |
| *H04W 72/04* | (2009.01) | |
| *H04W 74/08* | (2009.01) | |
| *H04W 72/00* | (2009.01) | |
| *H04W 64/00* | (2009.01) | |
| *H04W 76/00* | (2009.01) | |
| *H04W 76/02* | (2009.01) | |
| *B60R 25/33* | (2013.01) | |
| *G01S 5/00* | (2006.01) | |
| *G08G 1/00* | (2006.01) | |
| *B60W 10/06* | (2006.01) | |
| *B60W 10/18* | (2012.01) | |
| *B60W 10/20* | (2006.01) | |
| *B60W 50/14* | (2012.01) | |

(52) U.S. Cl.
CPC ............ *G08G 1/09* (2013.01); *G08G 1/0969* (2013.01); *G08G 1/142* (2013.01); *G08G 1/16* (2013.01); *G08G 1/161* (2013.01); *G08G 1/163* (2013.01); *G08G 1/166* (2013.01); *G08G 1/167* (2013.01); *G08G 9/02* (2013.01); *H04J 3/1694* (2013.01); *H04L 5/0091* (2013.01); *H04W 4/046* (2013.01); *H04W 4/06* (2013.01); *H04W 72/005* (2013.01); *H04W 72/0446* (2013.01); *H04W 74/0816* (2013.01); *B60R 25/33* (2013.01); *B60R 2325/205* (2013.01); *B60W 10/06* (2013.01); *B60W 10/18* (2013.01); *B60W 10/20* (2013.01); *B60W 50/14* (2013.01); *B60W 2550/402* (2013.01); *G01S 5/0027* (2013.01); *G08G 1/20* (2013.01); *H04W 64/006* (2013.01); *H04W 76/002* (2013.01); *H04W 76/023* (2013.01)

(56) References Cited

U.S. PATENT DOCUMENTS

| | | | | |
|---|---|---|---|---|
| 7,236,878 | B2* | 6/2007 | Watanabe | G01C 21/26 340/988 |
| 7,840,331 | B2* | 11/2010 | Yoshioka | G01C 21/26 340/995.13 |
| 7,979,198 | B1* | 7/2011 | Kim | G08G 1/091 701/117 |
| 2002/0198660 | A1* | 12/2002 | Lutter | G08G 1/0965 701/301 |
| 2009/0161644 | A1* | 6/2009 | Suzuki | H04W 72/10 370/341 |
| 2009/0231161 | A1* | 9/2009 | Malarky | G07B 15/063 340/933 |
| 2012/0028862 | A1* | 2/2012 | Jeong | C10M 161/00 508/433 |
| 2012/0120883 | A1* | 5/2012 | Chen | H04W 74/08 370/329 |
| 2012/0268295 | A1* | 10/2012 | Yuse | G01C 21/3691 340/905 |
| 2013/0116908 | A1* | 5/2013 | Oh | G01S 19/07 701/96 |

* cited by examiner

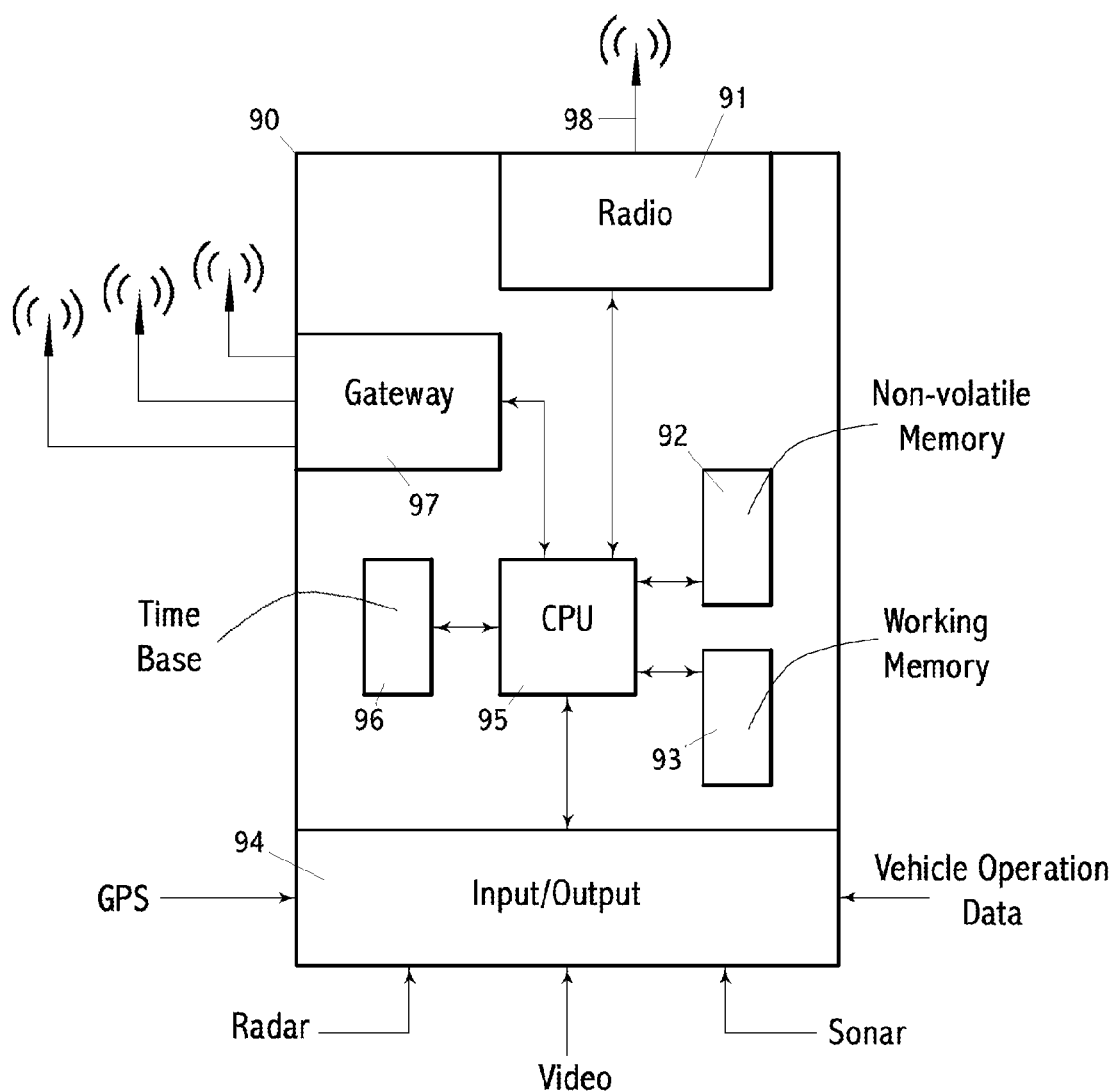

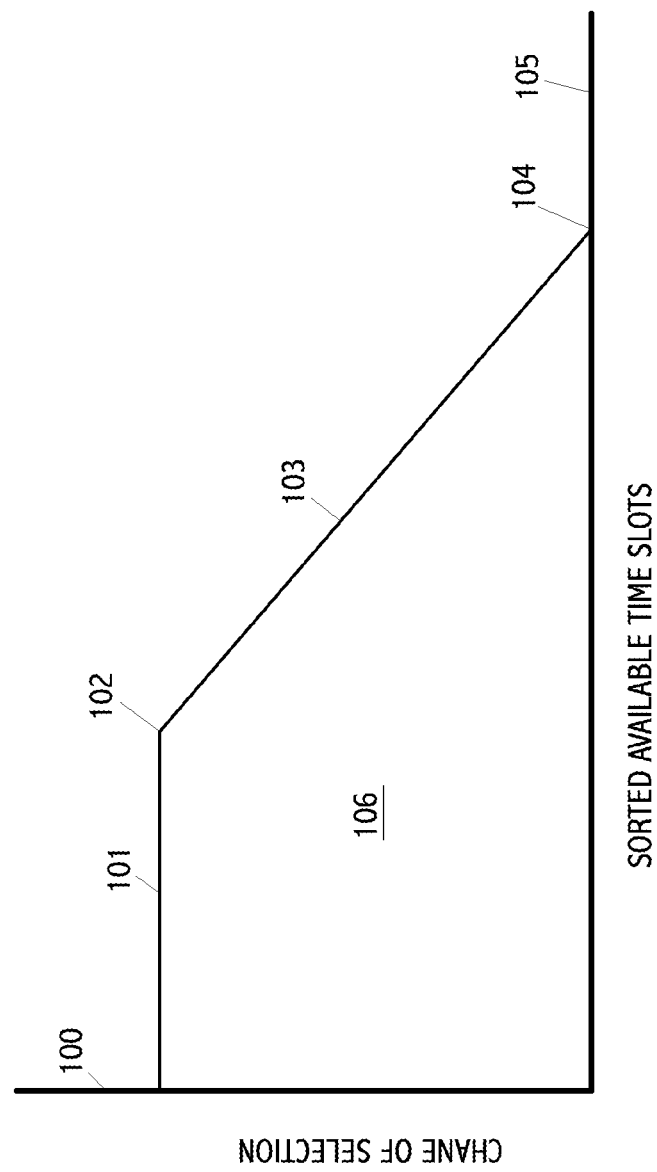

V2V SYSTEM WITH A HYBRID PHYSICAL LAYER

TECHNICAL FIELD

The technical field of this invention is vehicle-to-vehicle (V2V) communication, safety, and anti-collision systems.

BACKGROUND ART

Background art includes wireless communications protocols, including IEEE 802.11, using CSMA and wireless systems using TDMA, such as the Automatic Identification System (AIS). Some systems require a central authority, hierarchical architecture or road-side equipment (RSU). Some systems are completely self-configuring or "ad hoc." Nearly all prior art intended for V2V use includes permanent vehicle identification, and nearly all use IP address and MAC addresses. Background art suffers from: (i) insufficient bandwidth to handle the necessary number of vehicle in a V2V system, (ii) incomplete specifications such that enablement does not exist, (iii) non-real time operation which fundamentally fails to provide the purpose of a V2V anti-collision system, which is to prevent collisions, (iv) inconsistent or unreliable performance, and (v) a design which requires 90% of vehicles to be equipped for reasonable system-level performance.

Background Patents and Patent Applications include:
US 2012/0028862, published Feb. 2, 2012, by Nagai, Makoto, et al.;
U.S. Pat. No. 7,979,198-B1, published Jul. 12, 2011, by Kim et al.;
U.S. Pat. No. 7,236,878-B2, published Mar. 24, 2005, by Watanabe, Hisauyuki;
U.S. Pat. No. 5,506,587-A, published Feb. 21, 1993, by LANS, HÅKAN;
U.S. Pat. No. 3,566,0404, published Feb. 23, 1971, by Sorkin;
U.S. Pat. No. 6,765,495-B1, published Jul. 20, 2004, by Dunning, et al.;
US 2005/0886318A1, published Apr. 28, 2005, by Liu, Jie;
US 2012/0268295A1, published Oct. 25, 2012, by Yuse, Yoshio;
U.S. Pat. No. 7,840,331, published May 5-8, 2008, by Yoshioka, Mototaka;
US 2012/0120883, published May 17, 2012, by Chen, Chung-Min, et al.;
US 2008/0095163-A1, published Apr. 24, 2008, by Wai Chen, et al.
Non-patent background literature includes:
FELIX SCHMIDT-EISENLOHR; Interference in Vehicle-to-Vehicle Communication Networks; Feb. 9, 2010; KIT Scientific Publishing; Karlsruhe, Germany; FIGS. 6.3 & 6.6;
KARAGIANNIS, GEORGIOS; Vehicular Networking: A Survey and Tutorial, Feb. 11, 2010; IEEE Communications Surveys;
ON THE ABILITY OF IEEE 802.11P AND STDMA TO PROVIDE PREDICTABLE CHANNEL ACCESS; Bilstrup, Katrin, et al. 2009; Centre for Research on Embedded Systems, Lamstad University, Sweden;
TECHNICAL CHARACTERISTICS AUTOMATIC IDENTIFICATION SYSTEM MARITIME; Intl Telecom Union; 04-2010; Recommendation ITU-R M.1271-4; Geneva.

Priority is claimed to:
U.S. application Ser. No. 13/852,200, filed 28 Mar. 2013, with priority to U.S. application Ser. No. 13/557,711 filed 25 Jul. 2012, with priority to U.S. Provisional Appl. No. 61/637,588, filed 24 Apr. 2012;
U.S. application Ser. No. 13/852,176, filed 28 Mar. 2013, with priority to U.S. application Ser. No. 13/557,711 filed 25 Jul. 2012, with priority to U.S. Provisional Appl. No. 61/637,588, filed 24 Apr. 2012;
U.S. application Ser. No. 13/852,153, filed 28 Mar. 2013, with priority to U.S. application Ser. No. 13/557,711 filed 25 Jul. 2012, with priority to U.S. Provisional Appl. No. 61/637,588, filed 24 Apr. 2012;
U.S. application Ser. No. 13/633,657, filed 2 Oct. 2012, with priority to U.S. Provisional Appl. No. 61/637,588, filed 24 Apr. 2012;
U.S. application Ser. No. 13/557,711 filed 25 Jul. 2012, with priority to U.S. Provisional Appl. No. 61/637,588, filed 24 Apr. 2012; and
U.S. application Ser. No. 13/556,123, filed 23 Jul. 2012, with priority to U.S. Provisional Appl. No. 61/637,588, filed 24 Apr. 2012; and
U.S. Provisional Appl. No. 61/637,588, filed 24 Apr. 2012.

DISCLOSURE OF THE INVENTION

In various embodiments, this invention is a comprehensive, usable system that will actually function in a real-world V2V environment by overcoming the above-stated weaknesses of the prior art.

One, non-limiting scenario is described below:

Some vehicles are equipped with a transponder ("equipped vehicle"), some are not ("non-equipped vehicles.") Each second is divided into TDMA frames for 100 ms; each TDMA frame is divided into 1000, 100 µs time slots. The frames, or "basic time intervals," are subdivided into three dynamically-sized "class regions," a first class region, "priority," which starts at time slot 1, a second class region, "non-priority", and a third class region, "emergency" ending at time slot 1000. The priority and emergency class regions are similar, handling time-critical messages only, using TDMA protocol. The priority class region is for most vehicles, with the emergency class region reserved for emergency vehicles and government authorized road-size equipment (RSU). The priority class expands and contracts upward starting at time slot 1. The emergency class expands and contracts downward, starting at time slot 1000. The non-emergency class is all left over time slots, not in the other two class regions or in any buffer zones. The non-priority class region is managed in a modified CSMA protocol; and it handles longer messages and non-time-critical messages. The CSMA protocol is modified because messages may not overlap into the priority and emergency class regions, and messages broken into multiple frames are preferentially transmitted starting at the same time slot in each frame. Different priorities within the non-priority class region may use different back-off times and different other parameters based on the message priority.

We discuss the priority class region. Protocol for the emergency class region is similar, except for the above stated restrictions, and different parameters.

Priority class messages are nearly all fixed length, the length being one time-slot. Messages with more data are encoded using a higher-density encoding. A transponder self-selects a time slot, then keeps that same time slot until a time slot reselection condition occurs. The transponder transmits in its selected time slot in every frame, an action which "holds" that time slot so that another transceiver does not select it. A reselection condition is either (1) a message collision in that time slot, or (2) a time slot holding timer expires, combined with other conditions. When a transponder selects a new time slot it chooses, using a weighted random function, from the set of available time slots in its desired class region.

All transponders participate in identifying message collisions—that is, two or more transponders transmitting in the same time slot within a communication range. Any transponder detection a message collision sends a message collision notification message, unless a similar message has already been sent.

The size of the priority class region is dynamic, changing each frame based on how busy that class region is. The size of the class region is the larger of (1) the highest numbered time slot in use in the region, or (2) a size set to keep the number of available time slots above a threshold. The weighted time slot selection functions causes selected time slots to statistically "clump" near 1, keeping the size of the priority class region as small as possible. The reselection time-out causes transponders with high time slot number to eventually select a likely lower time slot number, keeping the priority class region as small as possible. One embodiment provides that there are always a minimum of 100 empty time slots in the priority class region, subject to total size of the frame.

Ideally, most of the time, the priority and emergency class regions are small, providing most of the time slots, and thus most of the available bandwidth available in the non-priority class region for a wide variety of messages, including courtesy messages, data update messages (e.g., lane maps and lane history), and social messages. If necessary, the priority and emergency class regions will expand to consume the entire frame, permitting up to 1000 time-critical messages to be sent ten times per second.

A targeted range for an effective communication range is 1 km. A targeted number of vehicles in a range set is up to 250.

A basic V2V safety message transmitted in the priority class region comprises (i) vehicle position, (ii) vehicle heading, and (iii) vehicle speed. It may also comprise a vehicle type code. It may also comprise a collision risk value and a collision type. It may comprise sub-messages, wherein a wide variety of sub-messages are defined. It may include elevation.

The vehicle position, heading and speed are compressed in a novel format that uses very few bits, keeping the messages size small, and thus permitting a highly reliable encoding. Vehicle position is sent as an offset from a nearby point on a predefined grid, such as every ½ degree of latitude and longitude.

IP address, MAC addresses and pre-assigned vehicle identifiers are not used. Vehicles are tracked solely by their position (unless still or video images are used to link a vehicle location to license plate or other permanent identification). This dramatically reduces the size of messages.

Nearly all priority messages are broadcast in clear text. PKI, encryption, and digital certificates may be used for messages in the non-priority class region. Vehicles may be identified either by (1) their location, or (2) their time slot.

Because the communication range for priority messages is short, such as 1 km, the time gap between transmissions may be short, such as 4 µs. Power is adjusted dynamically so that vehicles outside the range set do not interfere. The range, and the inter-transmission guard time, may be different for each of the three class regions. Thus, the emergency and non-priority class regions may have a significantly longer range.

A buffer zone of time slots may be used between the three class regions, such as 10 to 100 time slots, to enable rapid expansion of the priority and emergency class regions. The priority and emergency class regions may have a minimum size, such as 10 to 250 time slots.

A unique feature of embodiments is "proxying," whereby an equipped vehicle sends messages on behalf of a nearby non-equipped vehicle. A proxy hand-off is described. This embodiment permits effective operation of a V2V anti-collision system with as little as 10% of all vehicles being equipped.

A unique feature of embodiments is that no central authority is required. A system of deployed transponders is entirely self-sufficient. No government or cloud-based entity is required; no RSU is required; no IP addressing in required; no certificate authority is required.

BRIEF DESCRIPTION OF DRAWINGS

FIG. 9 shows an embodiment of a block diagram of a transponder.

FIG. 10 shows an embodiment of a weighted time slot selection function.

BEST MODE FOR CARRYING OUT THE INVENTION

Figure 1:
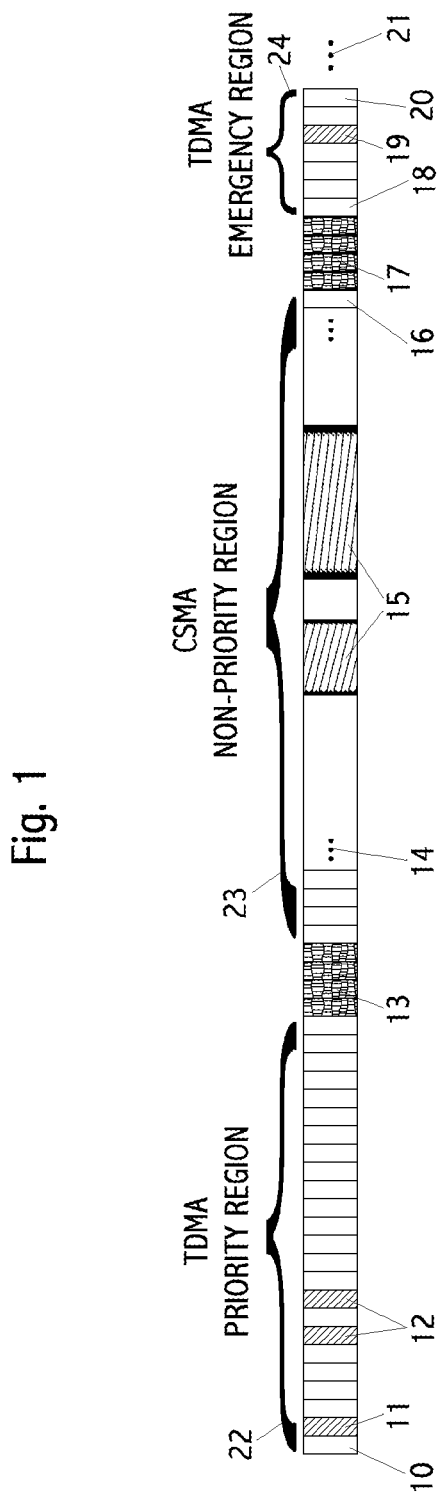
FIG. 1 shows one exemplary frame, time slots, and three class regions.

The essence of the V2V safety system is the regular broadcast, by all equipped vehicles of a vehicle "core data" time-critical, V2V safety message, comprising a vehicle's position, heading and speed, in a self-selected time slot in a repeating, fixed-time frame, or "basic time interval." The frame may be from 1 ms to 5000 ms; 100 ms is preferred. The number of time slots in a frame may be 10 to 10,000; 1000 time slots are preferred. Various wireless frequencies are possible, with government allocated frequencies for vehicle safety communications are preferred, such as are listed in IEEE 802.11p. Various modulations are possible, but the modulations as described in IEEE 802.11p are preferred.

The CSMA protocols of IEEE 802.11 are not effective for V2V safety applications. Thus, embodiments use a TDMA protocol, instead, with the TDMA frame divided into two or more class regions, as described above, with or without buffer regions between the class regions. One class region, the non-priority class region, uses a modified CSMA protocol to permit longer and non-time-critical messages, as compared to the priority and emergency class regions.

Fixed equipment, such as road-side unit (RSU) to vehicle communication is sometimes called X2V, or V2X. We use V2V to encompass all variations, including X2V, V2X, and defining cars, trucks, busses, trains, pedestrians, animals, moving sports equipment, construction equipment, fixed or temporary road hazards, government transponders, robots, automated vehicles and drones as "vehicles."

Collision prevention also includes collision mitigation and behavior modification that improves safety and safety margins, whether the vehicle behavior modification is automatic or human mediated.

A vehicle is "equipped" when it comprises a properly operating transponder sending valid V2V safety messages regarding a vehicle. An equipped vehicle may "proxy" for another, non-equipped vehicle, by sending data for the non-equipped vehicle on its behalf. In most case, "the vehicle" is either the equipped vehicle in which the transponder is located, or the non-equipped vehicle being proxied. Ideally, a single bit in the core safety message identifies if the message is a proxy message. A transponder may function as multiple transponders; for example, it may be sending messages for its host vehicles and two other, proxied vehicles; in this case, it acts as three separate transponders.

A transponder needs to know a vehicle's position, heading and speed. Typically, a mix of a global positing satellite receiver (such as GPS, or another system) and inertial navigation are used, often with other sensors or other data, to determine the "believed," "best computed" or baseline geographical position, heading, and speed. An electronic compass, magnetometer, accelerometer, motion sensor, or video inputs may be used. The actual transmitted position is compressed data, ideally an offset from a predetermined geographical grid. In addition, the transmitted position may be modified from the baseline position by a vector offset as part of "location consensus algorithm."

In one embodiment, a priority class region starts at frame 1 and grows upward based on demand; there may be a minimum size in the range of 10 to 500 time slots, such as 100 time slots. An emergency class regions starts at frame 1000 and grown downward based on demand; there may be a minimum size in the range of 10 to 100 time slots, such as 25 time slots. The emergency class region may be reserved for emergency vehicles, government authorized road-side equipment (RSU), or both. The priority class region is reserved for time-critical V2V safety messages; transponders should ideally self-select a single time slot in this class region and transmit a message in that time slot in every frame until a new time slot selection condition is met. However, a transponder occasionally not transmitting in a frame, or occasionally transmitting in a second time slot is still within the scope of claimed embodiments. Transponders should transmit in their selected time slot every frame, or at least in 50% of all frames.

The priority class region may be defined from time slot S1 to time slot S2 . For example, S1 may be 1 and S2 may be 100. The non-priority class region may be defined from S3 to S4. For example, S3 may be 126 and S4 is 900. The class regions should not overlap, noting that short term, small overlaps have a negligible effect on the overall effectiveness of the V2V safety system of this invention and are considered within the claimed embodiments. The emergency class region may be defined from S5 to S6. For example, S5 may be 976 and S6 may be 1000. In these examples there is a 25 time slot buffer (101-125) and a 75 time slot buffer (901-975).

Core data messages (position, heading and speed), message collision messages, network error or hacking detection notification, and risk warnings above a risk threshold are all time-critical V2V safety messages. Generally, a transponder will send core message data in every frame. It will supplement this core message data with additional data, either time-critical or not time critical, as the need to send those messages arises. It may, for a period of one frame at a time, substitute a non-core-data message for a core data message, using the same time slot. Thus, up to every other frame may be non-core-data messages.

Additional data, beyond the core data, may be transmitted in the time window of one time frame by increasing the modulation complexity. Modulation may be selected on a per-message basis. Thus, it may change every time slot, every frame, or from one class regions to another.

Demand within a class region may be measured by the number of transponders using the class region, the number of vehicles with representative data in the class region, the number of used time slots, or the number of empty time slots in the class region. These various metrics vary slightly, but are functionally equivalent. An ideal metric is the number of empty or non-empty time slots in the current class region. An empty time slot is one that was sufficiently free from other transmission or noise that it is suitable and available for selection by a transponder, for the immediately prior frame, or for n consecutive immediately prior frames, where n is in the range of 1 to 10. Good choices for n are 1 or 2.

In one embodiment the size of the priority class region resets at the end of each frame such that the number of empty time slots is a constant, such as 100, subject to a first limitation that a currently used time slot in class region, for example, time slot 163, restricts downsizing the class region to exclude the used time slot, and a second limitation that the priority class region may not grow into the emergency class region.

Similarly the emergency class region size resets at the end of each frame such that the number of empty time slots is a constant, such as 25, and the class region may not downsize such that it excludes a currently used time slot in the region. The emergency class region may expand to every time slot in the frame, if necessary.

The non-priority class region, which is managed with a modified CSMA protocol, consists of the "left over" times slots in the frame not in the priority or emergency class regions, or in any buffer zones. This class region supports a wide range of message times, message lengths, priorities, and modulations. It may have a different range, power, and inter-transmission guard time than the other class regions. Transmissions in this class region may not overlap with the priority and emergency class regions. They may overlap with a buffer zone for no more than one frame, and may not overlap with a buffer zone during the first transmission of a chained, or multi-part transmission. Differing priorities within this class region should use different parameters, such as different waiting times and different back-off periods. A multi-part transmission should start at the same time slot in each frame, even if the initial transmit time was selected using CSMA. A transponder may not begin transmitting in the non-priority class region until it first determines that all time slots that will be used by the transmission are empty in the immediately prior (or n immediately prior) frames. All transmissions in the non-priority class region ideally begin on time-slot boundaries, although they may end on a non-boundary, based on the length of the message.

Transponders self-select time slots, when then need to select a new time slot, in the priority and emergency class regions. They uses a weighted random selection algorithm that causes a higher or equal statistical probability of selecting a end-numbered time slot over a center numbered time slot within the set of available time slots in the currently defined class region. Thus, for the priority class region, time slots tend to "clump" in the lower numbered time slots. For the emergency class region, the weighted random selection algorithm causes selected time slots to clump in the higher numbered time slots. The probability function of the weighted random selection algorithm is monotonic, and the probability of selecting one available time slot in the desired class region is one.

Periodically, a transponder reviews its current time slot selection, using a time slot holding timer. For the priority class region, if the currently selected time slot is within the minimum size for the class region (such as in the first 100 time slots), there is no reason to select a new time slot. If the current time slot is outside the region that would be defined if the time slot were empty, the transponder should then select a new time slot. However, if high priority or high-risk messages are pending, the selection of a new time slot may be deferred. Time slot holding timers should be selected so as to minimize the likelihood that two transponders within communication range have their time slot holding timers expire at the same time. A suitable time period for the time slot holding timer is 10 seconds to 10 minutes, such as 2 minutes.

An embodiment of a transceiver continues to transmit in its selected time slot until either (a) it receives a transmit collision message involving itself, or (b) a time slot holding timer expires and the current time slot number is not in "no-reselection" range. Time slot holding timers may be 1, 2, 5, 10, 15, 30, 60, 90, 120, 180, 240, 300, or 600 seconds. No-reselection ranges may be 10, 20, 25, 50, 75, 100, 125, 150, 200, 250, 500 or 750 time slots. A preferred embodiment uses 90 second reselection timer and 100 time slot no-reselection range (slots 1-100) for the priority class region and 25 time slot no-selection range (slots 976-1000) for the emergency class region.

The size of the priority class and the emergency class regions should be adjusted after the end of every frame. They may be adjusted less often. If the priority class region begins at time slot S1 and ends at time slot S2, it consists of S2 −S1+1 time slots. Some of these time slots are empty, as defined above. The remaining time slots are non-empty. A time slot "in use" means that that in the immediately prior (or in one of the n immediately prior) frames, a valid message was received in that time slot. A time slot maybe non-empty but not in use; for example, it may contain noise. An available time slot has to be empty and otherwise be suitable for selection as a time slot by a transponder. Some time slots may be reserved, or otherwise not available. For example, time slot 1 or 1000 may be reserved (to permit much long transmission distances for time slot 1000 or 999, for example).

Note that the range set for each vehicle may be different, as each vehicle is in a different location and has slightly different communications hardware. Also, the transmit power may vary slightly for the vehicles in a range set. Thus, the computed size of the class regions may be different for every vehicle in a particular range set. However, the sizes will not differ by much; and, for vehicles close together, the computed sizes of the class regions will be close. This is one reason for the buffer zones. Also, this is why "non-empty" is used in setting the maximum time slot number of the priority class region, rather than "in use."

Equipped vehicles should send a V2V safety message in the priority class region in every frame, if the vehicle is operating. A parked vehicle may or may not be operating, or may be operating with different parameters. An operating emergency vehicle may stop sending in the emergency class region if it is no longer operating in an emergency mode. An emergency vehicle may send emergency or non-emergency priority messages in the priority class region. An emergency vehicle may send any type of message in the non-priority region, including emergency messages.

Government authorized road-side units (RSU) should generally not change their time slot, once selected, although such a change is permitted, and should occur if an appropriate message collision notification is received by the RSU. RSUs may use a very long, such as 10 minutes to 10 days, or infinite, time slot holding timer.

When adjusting the sizes of the class regions, the emergency class region is resized first, then the priority class region, then the non-priority class region. Thus, the non-priority class region gets the "left over" time slots, excluding any times slots in buffer regions or reserved time slots. Reserved time slots may be considered as a buffer region.

A key embodiment is that operating transponders self-select and then repeatedly use one time slot in every frame. In general, low data rate modulation schemes, such as BPSK or QPSK have lower data rates but higher reliability for a given power level, distance or background noise. High data rate modulation schemes, such as 256 QAM have higher data rates at the cost of potentially lower reliability or lower range for a given power level. Since each message in the priority and emergency class regions is generally restricted to one time slot, different modulation schemes translate to different maximum message lengths. Transponders should select the modulation scheme with the highest reliability for the necessary message size. Transponders are permitted to send priority class messages in the non-priority class region.

A message may consist of a Type 0 message, or may consist of one or more of sub-messages. Each sub-message has a non-zero Type number. Type 0 messages contain core data. Table I below shows the size of Type 0 and some sample sub-messages.

TABLE I

Message Sizes in Bits

| Field Name | Size | Type 0 | Header | Type 1 | Type 2 | Type 3 | Null |
|---|---|---|---|---|---|---|---|
| V2V revision level | 4 | 4 | 4 | | | | |
| Flags | 4 | 4 | 4 | | | | |
| Message size | 8 | 0 | 8 | | | | |
| Sub-message type | 6 | 0 | | 6 | 6 | 6 | 6 |
| Final risk | 4 | 4 | | 0 | 4 | 4 | 0 |
| Vehicle type | 6 | 6 | | 0 | 6 | 6 | 0 |

TABLE I-continued

Message Sizes in Bits

| Field Name | Size | Type 0 | Header | Type 1 | Type 2 | Type 3 | Null |
|---|---|---|---|---|---|---|---|
| Collision type | 4 | 4 | | 0 | 4 | 4 | 0 |
| Risk sources | 4 | 4 | | 0 | 4 | 4 | 0 |
| Offset N-S | 24 | 24 | | 24 | 0 | 24 | 0 |
| Offset E-W | 24 | 24 | | 24 | 0 | 24 | 0 |
| Angle of travel | 10 | 10 | | 10 | 0 | 0 | 0 |
| Speed of travel | 10 | 10 | | 10z | 0 | 0 | 0 |
| Lane type | 8 | 8 | | 0 | 8 | 8 | 0 |
| Risk type | 12 | 12 | | 0 | 12 | 12 | 0 |
| Fill | | | | | | | 18 |
| Subtotal | 128 | 114 | 16 | 74 | 44 | 92 | 24 |

Field definitions follow. V2V revision level is a 4-bit field that defines the applicable level of features or Standards used by the transponder. A value of zero means that the message is a Type 0 message, instead. The Flags field consists of four binary flags: emergency, final, forward, and proxy. The emergency flag is true if the message is transmitted by an emergency vehicle. The final flag is true if this message is the final frame of a "chained," or multi-part transmission, and true if the message is not a multi-part message. The forward flag is true if the message is a forwarded, rather than an original, message. The proxy flag is true if the message is a proxy message, meaning that vehicle described in the message is not the host vehicle for the transponder. The message size field is an 8-bit unsigned integer that is the number of 24-bit symbols in the message. The sub-message type is a 6-bit field identifying the type, and thus the length (which is fixed for each type of sub-message), of the sub-message. The final risk is a 4-bit field that contains the current computed risk value by the transponder. See the Final Risk Table, elsewhere herein. The Vehicle type is a 6-bit field that contains a vehicle type from a pre-determined Vehicle Type Table, described elsewhere herein. The Collision type is a 4-bit field that contains a collision type from a pre-determined Collision Type Table, elsewhere herein. The Risk sources field is a 4-bit field comprising four flags to identify the primary reason or reasons for the final risk. These flags are: vehicle behavior, road and weather conditions, traffic, and location history. Vehicle behavior means that one or more vehicles are behaving in an unsafe say; road and weather conditions means that the road condition or weather conditions, such as an icy surface are unsafe; traffic means that the overall behavior of traffic is unsafe; location history means that the stored history of the current location is unsafe. The threshold of "safe" or "unsafe" for the four flags in this field depends, in part, on the final risk value. Offset N-S is a 24 bit signed integer that represents the number of cm on a N-S longitude line from the nearest or selected grid point. Offset E-W is a 24 bit signed integer that represents the number of cm on an E-W latitude line from the nearest or selected grid point. Note that the two Offset fields, as transmitted, may have additional offsets due to location consensus. The two Offset fields make up the vehicle position. They may be considered a vector from the nearest (or selected) pre-defined grid point to the reference location on the vehicle. This embodiment uses distance, which should be either straight line or on the surface of the earth at the vehicle elevation. Other embodiments may use a unit in degrees, such a 0.1 seconds of arc. Angle of travel is a 10-bit field with an unsigned integer in the range of 0 to 1023, representing the 360° compass divided into 1024 equal headings, with true North being 0. The speed of travel field is an unsigned 10-bit integer that represents the forward speed of the subject vehicle in units of 0.1 m/s. (about 0.2 mph), with an offset of 10 m/s. Thus the range of this field is −10 m/s (field value of 0) to +92.3 m/s (field value of 1023). A stopped vehicle uses a field value of 100. Speeds in the range of −10 m/s to −0.1 m/s represent a vehicle backing up. For a vehicle backing up at a speed greater than 10 m/s, the vehicle should be "turned around," that is, the reference point should be moved to the center of the back of the vehicle and the speed now encoded as positive. This field has an approximate range of −22 mph to 206 mph.

Embodiments of a geographical grid for use in transmitting Offsets from a grid point include any predefined set of grid points; grid points spaced at 2°, 1°, 0.5°, 0.25°, 0.1°, 0.025° for latitude or longitude or both, or any interval in the range of 0.01° to 5°. Either or both the geographic grid and the transmitted offsets may be in units of latitude, longitude, or distance, or any combination. Elevation may also be based on elevation intervals while transmitting only an offset from a predetermined interval. Elevation intervals may be 10, 50, 100, 200, 500, 1000 meters, or any interval between 1 and 1000 meters or between 1 and 1000 feet. Generally, a transponder should use the nearest grid point; however, it should not change a grid point abruptly when another grid point becomes closer. A transponder may change grid points when a majority of vehicles in its range set are using a different grid point. A transponder must determined which grid point, out of as many as four possible grid points, is being used for each received message with a position. Only one such grid point will generate a rational (near by) position. A preferred geographical grid is the intersection points of all latitude and longitude lines at 0.5° intervals.

The PLCC preamble, FCS, SIGNAL, and other parts and aspects of the transmission, including modulations, but excluding MAC and IP addresses, higher level protocol data, minimum message size and CSMA parameters, are defined by IEEE 802.11p.

A Type 0 message comprises core data, that is: vehicle position, heading and speed, in the fields Offset N-S, Offset E-W, Angle of travel, and speed of travel, as described above. A Type 0 message does not contain any sub-messages and does not contain a message size field. As can be seen from the above Table, this basic, short message contains a substantial amount of data relevant to prevent or mitigate vehicle collisions. If core data is combined with other sub-messages, a Type 1 sub-message may be used for core data.

Messages containing sub-messages contain a Header, shown in the above table. The Header contains a Message size field, which indicates the number of 24-bit symbols in the message. Since each sub-message Type has is fixed length, it is easy to tell if a sub-message is the last sub-message, or if another sub-message follows. Following the Header are one or more sub-messages. Each sub-message begins with a 6-bit Sub-message type field. The Table above shows the fields used in four types of sub-messages: Type 1, Type 2, Type 3, and Null type. Type 1 sub-messages comprise core vehicle data of: vehicle location, heading and speed. Type 2 sub-messages contain risk and vehicle type fields. Note that Type 1 and Type 2 sub-messages, together, have essentially the same information as a Type 0 message. Type 3 sub-message are used to communicate a location of a risk that is not the location of the vehicle that is otherwise the subject of message of this transponder (such as the host vehicle or a vehicle being proxied). It comprises a location, but no heading or speed. For example, it might be the point of expected impact, or a location of an icy patch on a road. The other fields in the Type 3 message provide more information about the nature of the specific risk at the included location in the sub-message. A Null Type is used for padding, if necessary. There are many other sub-messages types, some of which are discussed elsewhere, herein.

The reference point for the location of a vehicle is the intersection of the center-line of the vehicle and the perpendicular line that comprises the forward most point on the vehicle. The elevation of the reference point is the road surface.

Novel features of an embodiment include broadcasting some or all of the fields and flags described above for a Type 0 message in a regular TDMA V2V message, such as in at least 50% of all frames.

TABLE II

| Lane Types and Lane Type Values | |
|---|---|
| Lane Type | |
| Lane information not in message | 0 |
| Indeterminate - not intersection | 1 |
| Indeterminate - intersection | 2 |
| Intersection - shared | 3 |
| Intersection - reserved | 4 |
| Turning right at intersection | 5 |
| Turing left at intersection | 6 |
| changing lanes leftward | 7 |
| changing lanes rightward | 8 |
| merging lanes leftward | 9 |
| merging lanes rightward | 10 |
| Lane 1 | 11 |
| Lane 2 | 12 |
| Lane 3 | 13 |
| Lane 4 | 14 |
| Lane 5 | 15 |
| Lane 6 | 16 |
| Lane 7 | 17 |
| Left shoulder | 18 |
| Right shoulder | 19 |
| Center shared left-turn lane | 20 |
| Left-side off-road | 20 |
| Left-side off-road | 21 |
| Right-side off-road | 22 |
| Merging lane on left | 23 |
| Merging lane on right | 24 |
| Right lane must exit | 25 |
| Left lane must exit | 26 |
| Shared merge on-off lane | 27 |
| Short merge | 28 |
| Lane or road classification change | 29 |
| Left-turn lane 1 | 30 |

TABLE II-continued

| Lane Types and Lane Type Values | |
|---|---|
| Lane Type | |
| Left-turn lane 2 | 31 |
| Left-turn lane 3 | 32 |
| Right turn lane (farthest right) | 33 |
| Right-turn lane (2nd from right) | 34 |
| Right-turn lane (3rd from right) | 35 |
| Traffic lanes with no lane marks | 36 |
| Shared bicycle lane straight ahead | 37 |
| Shared bicycle lane left | 38 |
| Shared bicycle lane right | 39 |
| Clover-leaf section | 40 |
| Traffic circle | 41 |
| Traffic circle - entering | 42 |
| Traffic circle - leaving | 43 |
| Two-way driveway, right side | 44 |
| Two-way driveway, left side | 45 |
| One-lane driveway, proper direction | 46 |
| One-lane driveway, improper direction | 47 |
| Unpaved, unmarked | 48 |
| Construction detour | 49 |
| Accident detour | 50 |
| Contradictory lane information | 51 |
| One-way lane, two-way traffic | 52 |
| Bridge lane | 53 |
| Cul-de-sac | 54 |
| HOV | 55 |
| HOV+ | 56 |
| Bicycle parking | 57 |
| Crosswalk | 58 |
| Sidewalk | 59 |
| Single parallel parking space | 60 |
| Single diagonal parking space | 61 |
| Parking on non-standard side | 62 |
| Parking lot, set spaces | 63 |
| Parking lot, open parking | 64 |
| Oversize vehicle parking space | 65 |
| Valet parking pickup/drop-off space | 66 |
| Red parking zone | 67 |
| Yellow parking zone | 68 |
| Green parking zone | 69 |
| White parking zone | 70 |
| Ferry or elevator parking space | 71 |
| Farm or construction equip parking | 72 |
| Handicap parking space | 73 |
| Private garage | 74 |
| Motorcycle parking | 75 |
| Off-road bicycle path | 76 |
| Off-road pedestrian path (paved) | 77 |
| Off-road pedestrian path (unpaved) | 78 |
| Off-road animal path | 79 |
| reserved | 80-254 |
| unknown | 255 |

TABLE III

| Sub-message Types and Sub-message Values | |
|---|---|
| Sub-message Type | |
| Type 0 Message | n/a |
| Null message | 0 |
| Vehicle position | 1 |
| Vehicle core data | 2 |
| Message collision using time slot | 3 |
| Message collision using location | 4 |
| Data request | 5 |
| Signal power | 6 |
| Risk detail | 7 |
| Vehicle size detail | 8 |
| Vehicle identity detail | 9 |
| Traffic detail | 10 |
| Conditions detail | 11 |
| Location detail | 12 |
| Accident detail | 13 |

TABLE III-continued

Sub-message Types and Sub-message Values

| Sub-message Type | |
|---|---|
| Detour detail | 14 |
| Forwarding detail | 15 |
| HOV detail | 16 |
| Calibration beacon | 17 |
| Emergency message type | 18 |
| Roadside message type | 19 |
| Traffic signal detail | 20 |
| Courtesy message | 21 |
| Parking detail | 22 |
| Location history | 23 |
| Lane data sharing | 24 |
| Message encryption and signing | 25 |
| Audio data | 26 |
| Video or image data | 27 |
| Commercial information | 28 |
| Network Warning | 29 |
| IP embedded | 30 |
| 200 bit | 31 |
| 400 bit | 32 |
| 800 bit | 33 |
| 1600 bit | 34 |
| 3200 bit | 35 |
| 6000 bit | 36 |
| 12000 bit | 37 |
| Reserved | 38-62 |
| Test - ignore message | 63 |

TABLE IV

Risk Values and Meaning

| Value | Risk Meaning |
|---|---|
| 0 | No risk value in this message. |
| 1 | No risk behavior identified, "zero known risk." |
| 3 | Challenging driving conditions; increase caution. |
| 4 | Significant potential risk; drivers should be aware of the risk source. |
| 5 | Significant, defined risk; drivers or vehicles should modify behavior. |
| 8 | Very high risk; automatic mitigation or avoidance strongly recommended. |
| 9 | A collision is predicted; automatic avoidance and mitigation required. |
| 10 | A collision has occurred. |

TABLE V

Collision Type Values and Meaning

| Value | Collision Type |
|---|---|
| 0 | No collision information in message |
| 1 | Rear-ender |
| 3 | Side-swipe |
| 4 | Head-on |
| 5 | Pedestrian, bicycle, or motorcycle |
| 6 | Multi-vehicle |
| 7 | Single-vehicle on roadway |
| 8 | Single-vehicle off roadway |
| 9-14 | reserved |
| 15 | unknown collision type |

TABLE VI

Message Collision Notification Sub-Message Using Time Slot

| Bits | Field Name |
|---|---|
| 6 | Sub-message type (value = 3) |
| 12 | Message collision time slot number (0-4096) |
| 4 | Number of detected messages collision in this time slot (1-15) |
| 4 | Received signal power in the time slot (1-15) |
| 4 | reserved |
| 30 | Total bits in sub-message |

TABLE VII

Message Collision Notification Sub-Message Using Location

| Bits | Field Name |
|---|---|
| 6 | Sub-message type (value = 4) |
| 12 | Message collision time slot number (0-4096) |
| 24 | Position Offset N-S |
| 24 | Position Offset E-W |
| 4 | Number of detected messages collision in this time slot (1-15) |
| 4 | Received signal power in the time slot (1-15) |
| 4 | reserved |
| 78 | Total bits in sub-message |

TABLE VIII

Vehicle Type and Value

| Vehicle Type | |
|---|---|
| no vehicle type in message | 0 |
| private car, pickup or van | 1 |
| limousine, long or stretch | 2 |
| commercial car, pickup or van | 3 |
| medium size commercial truck | 4 |
| stopped medium delivery vehicle | 5 |
| semi tractor only | 6 |
| semi, one trailer | 7 |
| semi, two trailers | 8 |
| short bus | 9 |
| full-size bus or RV | 10 |
| emergency vehicle, up to medium | 11 |
| emergency vehicle, large | 12 |
| farm vehicle | 13 |
| oversize vehicle | 14 |
| roadside fixed equipment | 15 |
| roadside fixed obstruction | 16 |
| in roadway debris | 17 |
| accident | 18 |
| roadside construction equipment | 19 |
| bicyclist | 20 |
| pedestrian, upright | 21 |
| pedestrian, high speed | 22 |
| handicapped person, e.g. wheelchair | 23 |
| person down on roadway | 24 |
| crowd on roadway | 25 |
| event on roadway (e.g. crafts fair) | 26 |
| domestic animal e.g. guide dog | 27 |
| non-domestic animal, e.g. livestock | 28 |
| other tiny (size TBD) | 29 |
| other small (size TBD) | 30 |
| other medium (size TBD) | 31 |
| other large (size TBD) | 32 |
| other oversize (size TBD) | 33 |
| reserved | 34-62 |
| unknown vehicle type | 63 |

Table I—Lane Types and Lane Type Values, above, shows one embodiment how different traffic lanes, and pedestrian and sports areas, are coded in a V2V message field of 8-bits.

Lane type is very useful to use with traffic signal timing, as the phases are frequently related to lane type. For example, left turns and through lanes may have different phases. Lane type and lane maps are critical for an effective V2V system. Some embodiments generate their own lane maps and make their own lane type determinations. Thus, some embodiments are fully independent of any government or central authority to generate, provide, maintain and protect such information. Embodiments that generate their own lane maps and lane type determinations generally use vehicle behavior to for these purposes, although vision based and other sources if information may also be used. Embodiments share this data via lane map requests and lane map transmissions. The physical location of lanes may be encoded using endpoints, waypoints, corner points, Bézier curves, elevation angles, and other methods known in the art. Fields are ideally offsets from a predetermined set of grid points. Compression may be used.

Table III—Sub-message Types and Sub-message Values, above, shows one embodiment of the range of sub-messages, where the sub-message type is encoded in a 6-bit field. Each sub-message type is fixed length, not shown in this table. Messages are either Type 0, which has no sub-message type and no sub-messages, or contains a header as shown in Table I, plus one or more sub-messages, where each sub-message begins with a sub-message type field. Sub-messages in a message are parsed in sequence. The length field in the header identifies if there is another sub-message in the message.

Table IV—Risk Values and Meaning, above, shows one embodiment of how risks are coded in a 4-bit field. Typically, a vehicle operator, owner, or manufacturer will determine what actions to take based on the receiving transponder and other vehicle circuitry's risk determination, which may weigh heavily the received risk value. Typically, low risk values cause no action; intermediate risk values provide visual, audible, or haptic warnings of increasing urgency; high risk values trigger automatic response or mitigation measures. It is desirable to standardize, to some level, vehicle responses to received risk. A 10-value table such as this is easy for people to understand. A risk level of 4 or high is generally considered "high risk," where a driver should be notified and message priority may change. A risk level of 8 or higher should cause automatic vehicle accident avoidance and mitigation.

Table V—Collision Type Values and Meaning, above, shows one embodiment of how collision types are coded in a 4-bit field. The collision types shown make up nearly vehicle collisions. For vehicle to know the potential or predicted (most likely) collision type is a significant advantage. Avoidance or mitigation actions vary significantly based on the type of collision to avoid. For example, mitigation for possibly running over a pedestrian is different than possibly being hit from the side by a truck.

Table VI—Message Collision Notification Sub-Message Using Time Slot, above, shows one embodiment of sub-message collision notification fields. The field names and ranges are self-explanatory, or are explained elsewhere herein. If the number of message collisions for this time slot is more than 15, the value 15 is used. 0 may be used for testing. The received signal power level is a value in the range 1 to 15. This is useful in estimating how far away the sources of the message collision may be. It is also useful for selecting from a set of conflicting message collision messages, should that happen. A value of 0 may be used for testing.

Reserved bits in any message or table allow for future revisions and enhancements.

Table VII—Message Collision Notification Sub-Message Using Location, above, shows another embodiment of sub-message collision notification fields. This sub-message has the same fields as the above sub-message in Table VI, with the addition of a position of one vehicle that is believed to be a participant in the message collision. Typically, a first transponder is receiving regular valid messages in a first time slot from a second vehicle. Then, a message collision is identified in the first time slot. The highest likelihood situation is that the second transponder is one of the participants in the message collision, and the last sent vehicle position (and heading and speed) of the second vehicle may be used to inform the identify the second vehicle. This second vehicle is likely the closest vehicle participating in the message collision, and thus has the highest likelihood of receiving the message collision notification properly. This sub-message type is preferred over the sub-message type of Table VI, if it is available.

Table VIII—Vehicle Type and Value, above, shows an embodiment of coding a vehicle type into V2V messages, including core data Type 0 messages. A 6-bit field is used. The purpose of this field is not to include all possible vehicle types, but rather to provide critical information that is needed to make a reasonable safety or collision avoidance or mitigation response. There is a critical difference in being about to be hit from the side by a semi or are about to run over a pedestrian down on the road. Thus, size, weight and fundamental category (truck, pedestrian, animal, etc.) are the primary differentiators of different vehicle types in this field.

FIG. 1 shows an exemplary frame, time slots and three class regions. This frame is 1000 time slots, starting with time slot 1, shown as reference designator 10, up through time slot 1000, shown as reference designator 20. The TDMA managed priority class region is shown with bracket 22 and comprises time slots 1 through 24. The CSMA managed non-priority class region is shown with bracket 23 and comprises time slots 29 through 989. The TDMA managed emergency class region is shown with bracket 24 and comprises time slots 994 through 1000. Two buffer zones between the CSMA and the TDMA regions are shown as 13 and 17. Each of these buffer zones is shown as four time slots in size. In the priority class region, three time slots are in use, shown as designators 11 and 12. These time slots are numbered 2, 7 and 9. Note that these three time slots are "clumped" near the time slot number 1 end of the priority class region. In the emergency class region, one time slot is in use, number 998, shown with designator 19. Designator 21 shows three dots indicating that the frames repeat continuously. The frame shown may be 0.1 ms in length, with 1000 time slots each 100 μs in length. In the CSMA managed non-priority region, two messages are shown, 15. Note that these messages are variable length and are longer than one time slot. Although there are time slots in the non-priority region, time slots are less important than in the TDMA managed regions, and are not shown in FIG. 1 except for four time slots at the beginning and one time slot at the end. Designator 14 shows with three dots how these time slots continue throughout the non-priority class region. Designator 16 shows the last time slot, number 989, of the non-priority region. Empty time slots are shown as white. Designator 18 shows time slot number 994, which may be considered the "last" time slot in the emergency class region (with the region "starting" with time slot number 1000, designator 20) as the emergency class region grows downward as demand in the region increases. As demand for the priority region increases, the border between the priority and non-priority regions moves upward, and thus the non-priority region become smaller. As demand for the emergency region increases, the border between the emergency and non-priority regions moves downward, and thus the non-priority region become smaller. The buffer zones are optional, and may vary in size depending on the size of the nearest TDMA region.

In FIG. 1, the priority class region is time slot numbers from S1 to S2, where S1 is 1 and S2 is 24. The non-priority class region is S3 to S4, where S3 is 29 and S4 is 989. The emergency class region is S5 to S6, where S5 is 994 and S6 is 1000. This embodiment may have a frame of 100 ms, with 1000, 100 μs time slots. Alternative time slot times are 500, 200 μs time slots, and 250, 400 μs time slots.

In FIG. 1, designator 15 shows two CSMA messages in the non-priority class region. Note that the time gap between the two messages is larger than the time width of one time slot, indicating an embodiment where the inter-message guard time (called the inter-frame time in IEEE 802) is larger in this class region than in the two TDMA regions. Transmit power and desired or effective communication range may be higher, too. Modulation may be different, as well; for example, it may be higher bit rate modulation to encode more data at the cost of lower reliability delivery of the non-critical message.

Figure 2:
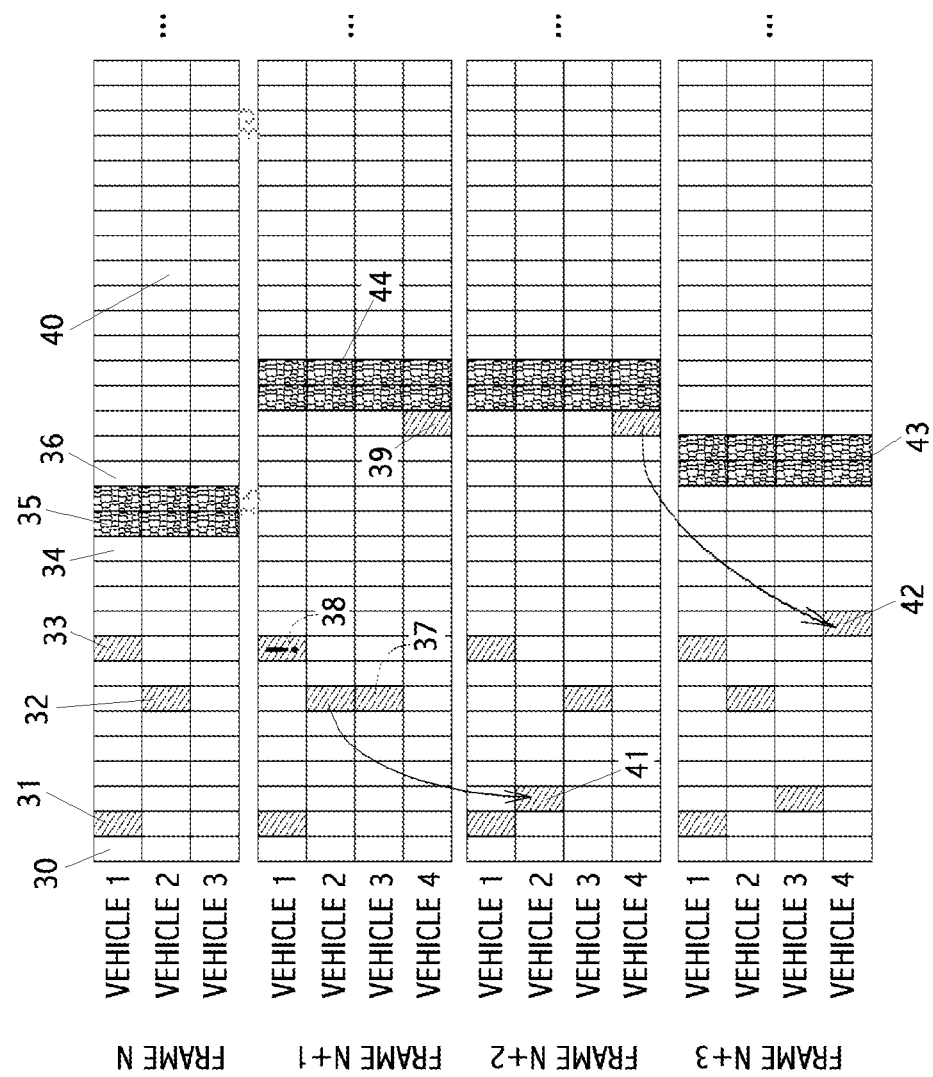
FIG. 2 shows four exemplary frames with numerous time slot activities, include a message collision and class region re-sizing.

FIG. 2 shows some exemplary frame portions with time slot activity. Four frames are shown, nominally consecutive frames (but not necessarily), labeled "FRAME N," "FRAME N+1," "FRAME N+2," and "FRAME N+3." Only the first 32 time slots are shown, and time slots numbers are not shown in the Figure. Three dots indicate the time slots continue. Time slot usage for four vehicles is shown, "VEHICLE 1" through "VEHICLE 4." In FRAME N, only two vehicles are shown transmitting: VEHICLE 1 and VEHICLE 2. VEHICLE 3 may be out of radio range, for example. Reference designator 30 shows time slot number 1. Each time slot is repeated as a column in the Figure. Designator 31 shows VEHICLE 1 broadcasting in time slot number 2. Designator 32 shows VEHICLE 2 broadcasting in time slot number 7. Designator 33 shows VEHICLE 1 also broadcasting in time slot number 9. VEHICLE 1 is broadcasting in two time slots likely because it is proxying another vehicle. Designator 34 shows time slot 13, which is the last time slot in the current priority region. Note that there are three time slots used (numbers 2, 7 and 9) and ten empty time slots. Ten empty time slots may be the predetermined minimum number of empty time slots for the priority region, in this example. Designator 35 shows the start of a two-time-slot buffer region, in time slots 14 and 15. Designator 36 shows the first time slot in the non-priority region. Designator 40 shows generally the non-priority region, which in this Figure, has no broadcasts for the pictured time period.

Continuing with FIG. 2, in FRAME N+1 we observer five new activities. First, VEHICLE 3 is now broadcasting in range, using time slot 7, shown as designator 37. Second, there is a message collision in time slot 7 because both VEHICLE 2 and VEHICLE 3 are broadcasting in the same time slot. Third, the transponder for VEHICLE 1 has detected the message collision and is broadcasting a message collision notification message, shown with the exclamation mark, as designator 38. Fourth, VEHICLE 4 is also with range, using time slot number 18. Note that this time slot was not in the range of the priority class region in FRAME N. This may be due to VEHICLE 4's determination of the size of the priority region was larger than shown in FRAME N (for the range set of VEHICLE 1 and VEHICLE 2). Alternatively, VEHICLE 4 may have had trouble getting an empty slot, and so VEHICLE 4 expanded the size of the priority class region by choosing a time slot in a buffer zone, or even in the prior non-priority region. Fifth, as a result of VEHICLE 4's use of time slot 18, the size of the priority region expands to 18 time slots, as shown by the moved buffer zone, designator 44. In time slot number 18, VEHICLE 4 has received VEHICLE 1's message collision notification. Thus, even though VEHICLE 4 also observed the message collision in time slot number 7, it does not send a message notification message, designator 39. In this example, the number of allowed message notifications of the same message collision is one. If it were two or higher, then the time slot at designator 39 would contain a second message collision notification message. Such a message might have identified VEHICLE 3, instead of VEHICLE 2, as possibly vehicles 3 and 4 are travelling close together, and so VEHICLE 4 has been receiving VEHICLE 3's message in time slot 7 for some time.

Continuing with FIG. 2, in FRAME N+2, we observe that VEHICLE 1's message collision notification message in time slot 9 was received by VEHICLE 2. VEHICLE 2 immediately selects a new empty time slot, here time slot number 3, shown with designator 41. VEHICLE 1 has a choice of two message collision notification types. It may identify the message collision by the time slot, here number 7, or by VEHICLE 2's location. It knows (likely) that VEHICLE 2 is participating in the message collision due to the VEHICLE 2's use of time slot 7 in the prior FRAME N, shown as designator 32. In this case, only VEHICLE 2 needs to select a new time slot. If VEHICLE 1 had instead used time slot number 7 in its message collision notification message, designator 38, then both VEHICLE 2 and VEHICLE 3 would have selected new time slots, assuming that both vehicles properly received the notification message.

Continuing with FIG. 2, in FRAME N+3 we see that VEHICLE 4 has selected a new time slot number 10, designator 42. Since the minimum size of the priority class region is only 10 empty time slots, in this example, and in FRAME N+2 there are 13 empty time slots, when VEHICLE 4's time slot holding time expires at the end of FRAME N+2, it chooses a new frame, hopefully one with a lower frame number, allowing the size of the priority class regions to shrink and the non-priority region to expand. Indeed we see this as the buffer zone has now moved, designator 43, such than in FRAME N+3 there are again exactly 10 empty time slots in the priority class region.

Figure 3:
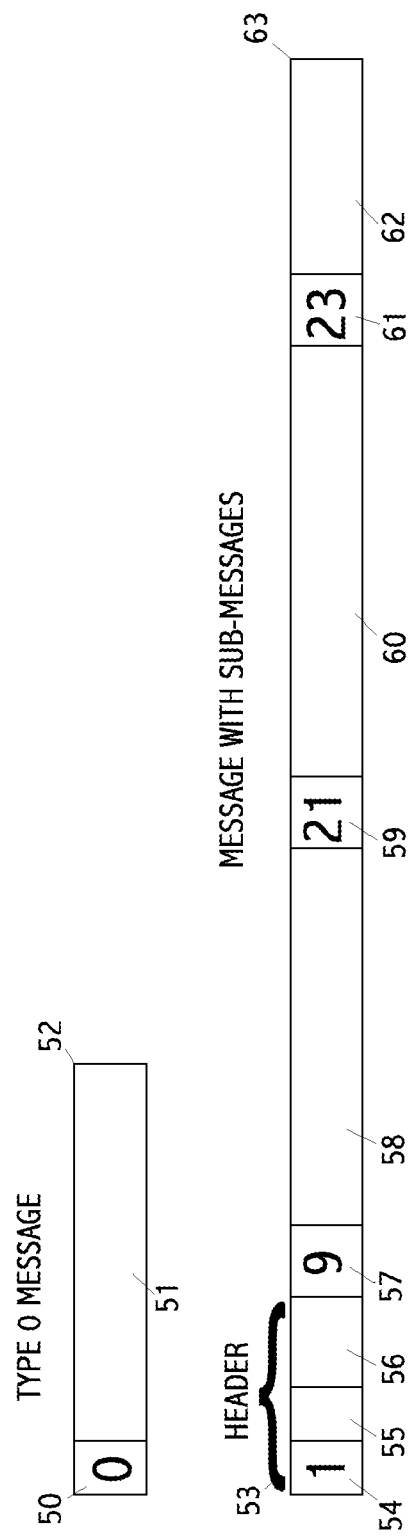
FIG. 3 shows a Type 0 message and a message with sub-messages.

FIG. 3 shows a block diagram of two message types: a Type 0 message and a message with sub-messages. A Type 0 message does not have sub-messages and does not use a header. The first field, designator 50, consists of a zero. The fields, not detailed in this Figure, follow, designator 51. Designator 52 shows the overall Type 0 message. Not shown are any preamble, SIGNAL, FCS, tail bits, and the like. A message with sub-messages, an example of which is shown in this Figure as designator 63, usually contains more data than a Type 0 message. In this Figure, the relative length of the two messages indicates data quantity, not broadcast time. Designator 53 shows the three header fields, indicated by the bracket. This message contains three sub-messages. Designator 54 shows the V2V Revision Level field, here with a value of one. Designator 55 shows the 4-bit Flags field. Designator 56 shows the 8-bit message size field for this entire message, in units of 24-bit symbols. Designator 57 shows the first sub-message type field, here with a value of nine, to indicate a Vehicle Identity Detail sub-message. The data in this sub-message follows, designator 58. Each sub-message size is fixed by its Type. The message length in the header, designator 56, indicates there is more data in the message. The next sub-message begins with a Type field, designator 59, here with a value of 21, indicating a Lane Data Sharing sub-message. The data for this sub-message follows, designator 60. Again, the message length indicates another sub-message, beginning with a Type field, designator 61, here with the value 23, indicating a Parking Detail sub-message. The data for this sub-message follows, designator 62. These three sub-messages together with the Header, are the length of the header length field, so no more sub-messages follow.

Figure 4:
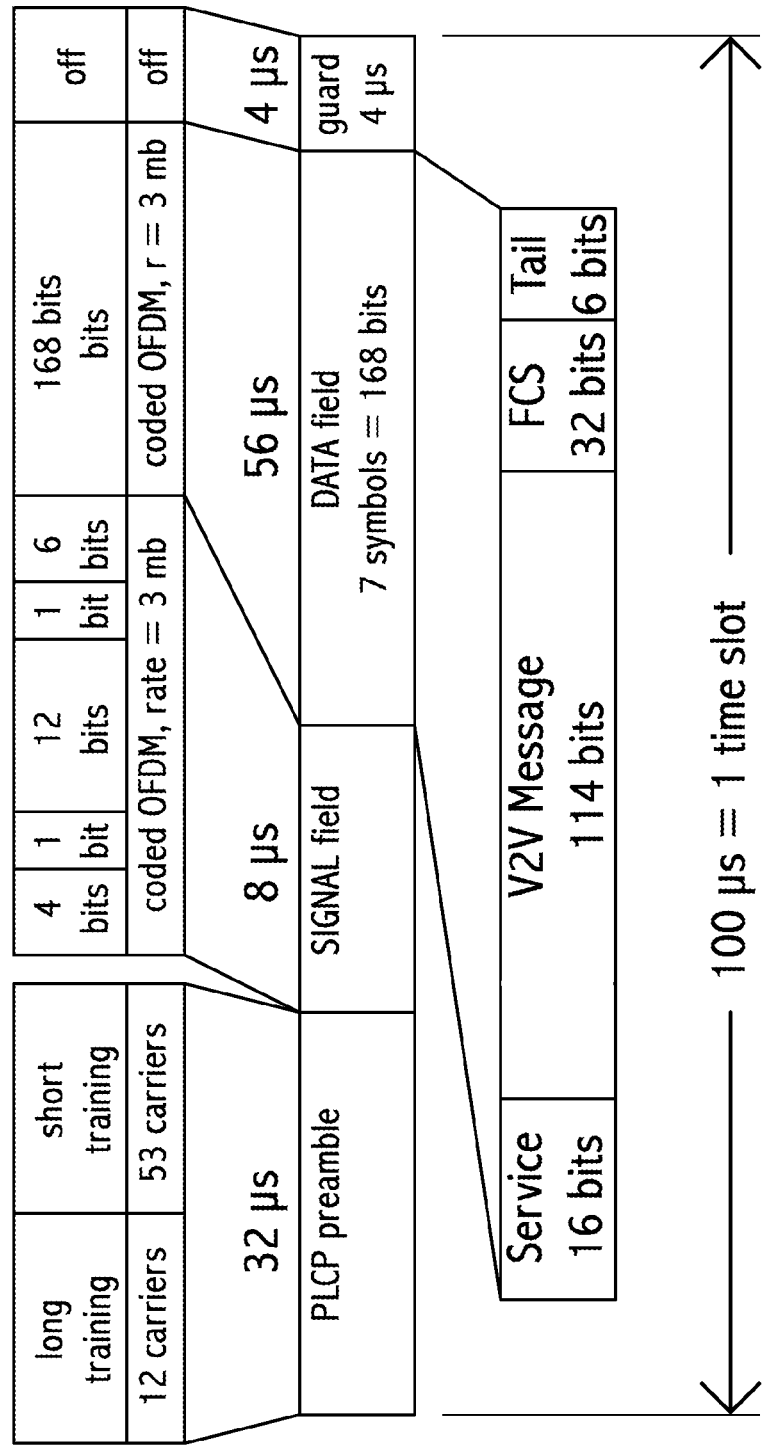
FIG. 4 shows a single 100 µs message frame in IEEE 802.11p format, with a 3 mbit/s modulation, comprising SIGNAL, SERVICE, FCS, and Tail fields, with 114 bits available for a V2V message.

FIG. 4 shows the field lengths and timing for message using 3 mbit/sec (mb/s) modulation for a 100 μs time slot, including a 4 μs guard time. The available time for V2V message data is 7, 24-bit symbols, including the SERVICE, FCS and tail bits, leaving 114 bits net for the message.

Figure 5:
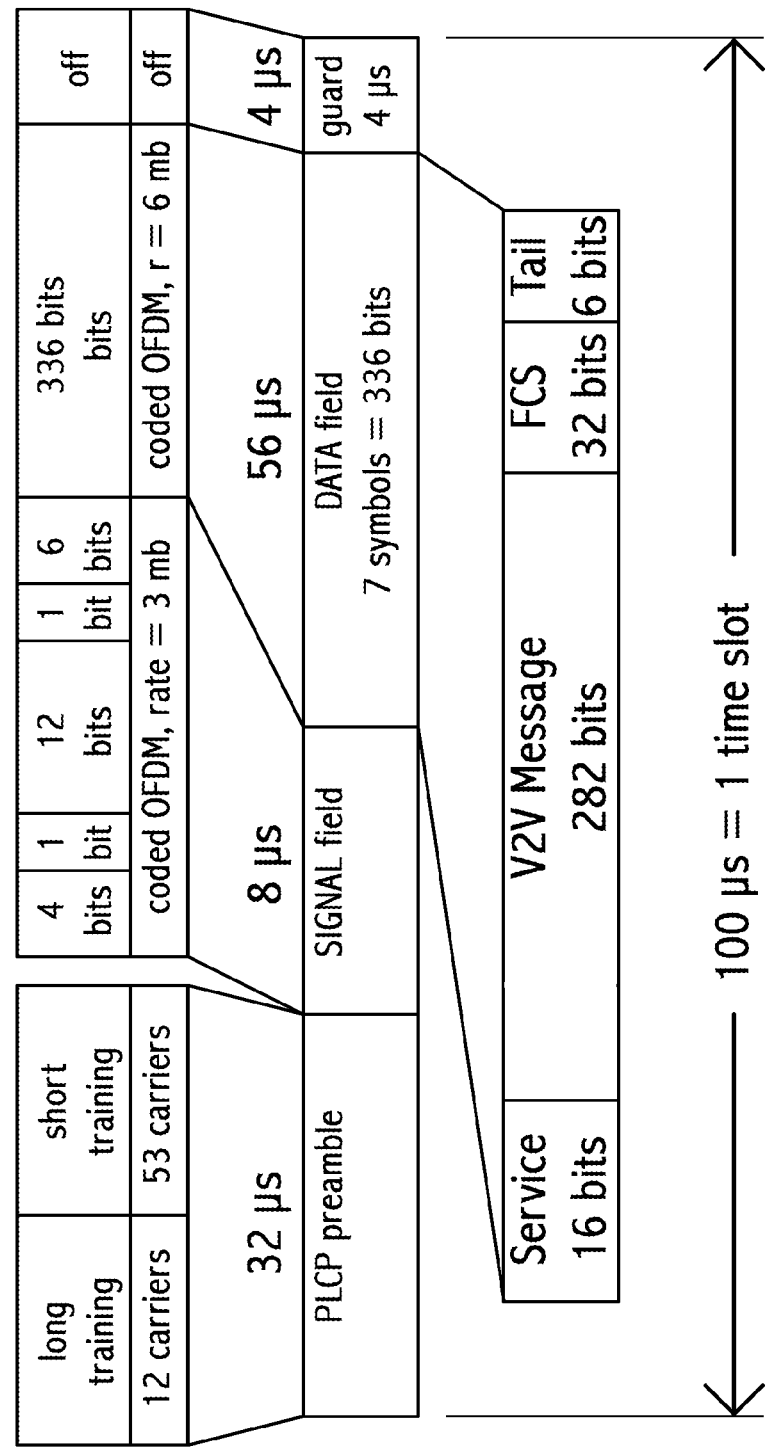
FIG. 5 shows a single 100 µs message frame in IEEE 802.11p format, with a 6 mbit/s modulation, comprising SIGNAL, SERVICE, FCS, and Tail fields, with 282 bits available for a V2V message.

FIG. 5 shows a diagram, timing and V2V message size as in FIG. 4, but for 6 mb/s modulation. The available time for V2V message data is 7, 48-bit symbols, leaving 282 bits net for the V2V message. Calculating net message length for other modulations, other time slot lengths, and other guard times is done similarly.

Figure 6:
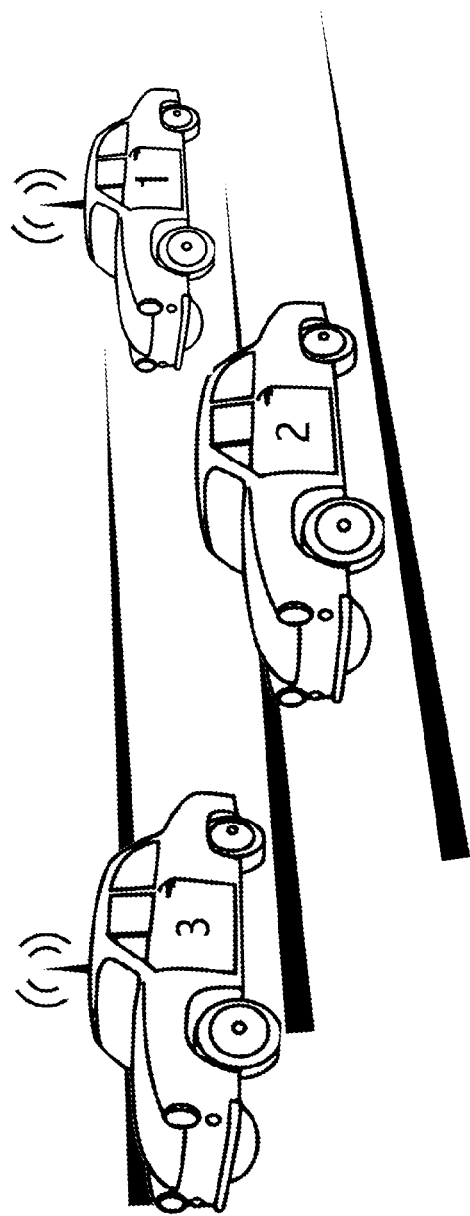
FIG. 6 shows three exemplary vehicles in two traffic lanes, with vehicles 1 and 3 equipped with V2V transponders; vehicle 2 is unequipped and being proxied.

FIG. 6 shows three vehicles. Vehicles 1 and 3 are equipped with a V2V transponder. Vehicle 2 is not equipped. It is being proxied by either vehicle 1 or vehicle 3.

Figure 7:
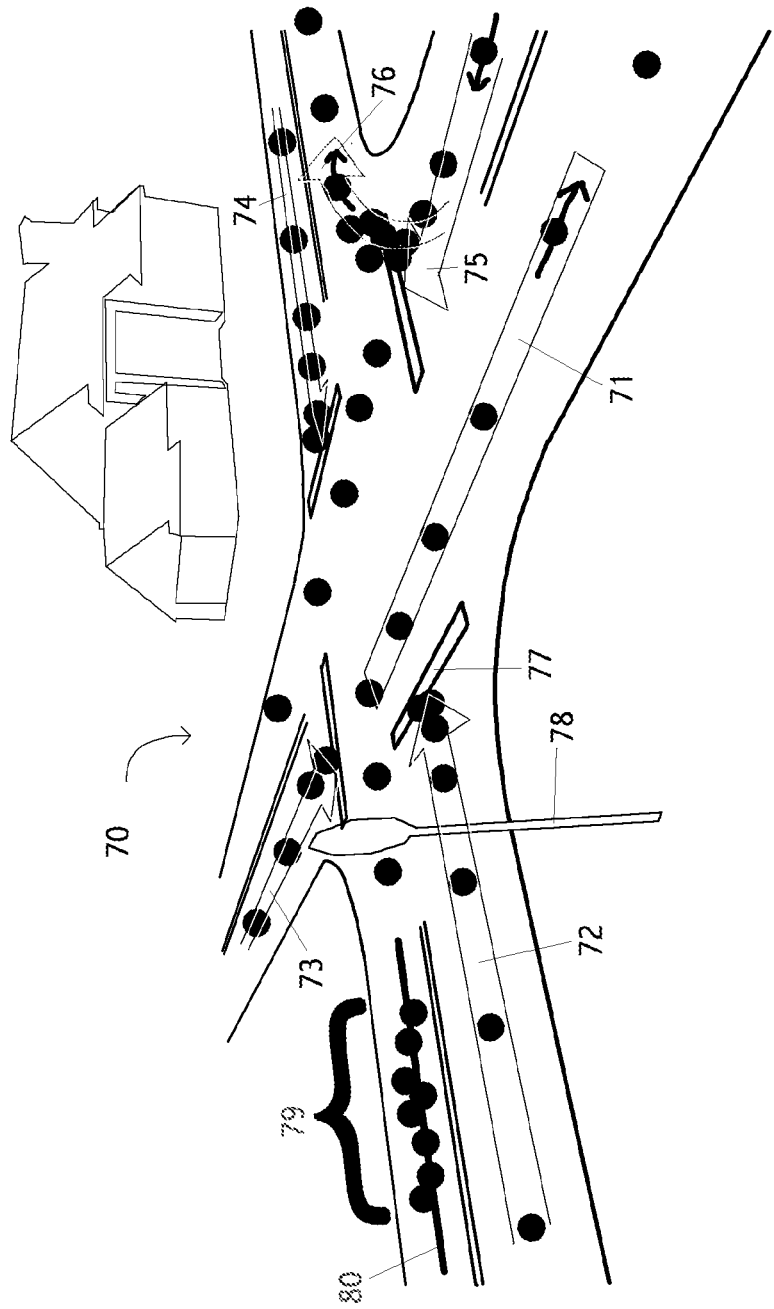
FIG. 7 show exemplary location points near an intersection, used to construct lane records.

FIG. 7 shows location points and how they are collected and used to generate lane records in a lane record store. 70 shows a typical intersection, here, a four-way stop. The paths of individual vehicles are recorded. Six such paths are shown in this Figure: 71, 72, 73, 74, 75, and 76. Path 76 is turning right; the other paths are going straight. Paths 72, 73, 74 and 75 approach four different stop signs, and stop. Path 71 accelerates away from a stop. Such activities, when repeated similarly by a plurality of vehicles, indicate the lane and road as people actually drive it. Core to this embodiment is that lane records are built from actual recorded behavior of many different vehicles; they are not created by a single audit or map source, nor provided by any central, cloud or government authority. For example, independent of any stop sign locations or stop line markings (or no marking), the average behavior, and the range of variation of those behaviors, determines if a given vehicle is behaving appropriately or not. As vehicles repeatedly approach and stop (or slow) at stop line 77, the existence of stop sign 78 is deduced. The collection of points in path 76 shows the in-practice turn radius of that right turn. Aggregates of points from many different vehicles, as shown by the bracket 79, are averaged to produce a mean lane line, 80. The mean deviation may be used to deduce a usable lane width. Similarly, average speed and speed deviations are used to create a profile of acceptable behavior for the lane, which is recorded both in the lane record and in the road history record. The lane record provide, in essence, average and common usage, while the road history provides, in essence, worst-case history in the context of statistical averages.

Figure 8A:
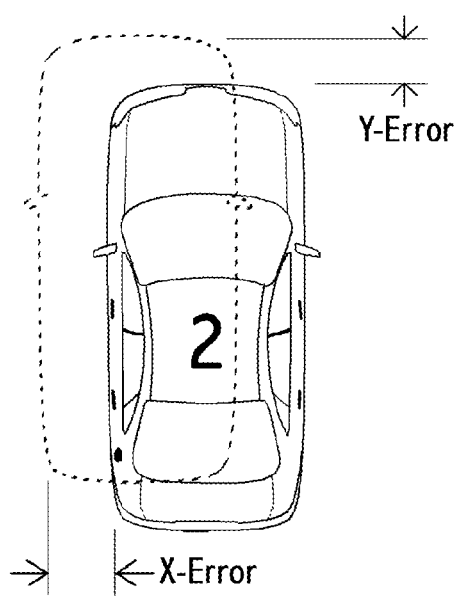
FIGS. 8A and 8B show a location consensus algorithm step.
Figure 8A:
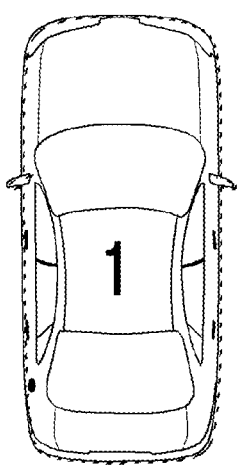
Figure 8B:
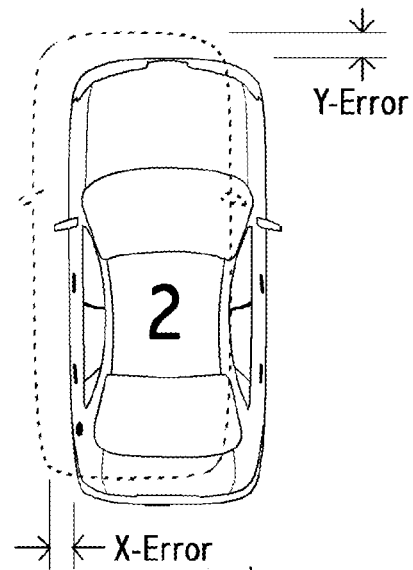
Figure 8B:
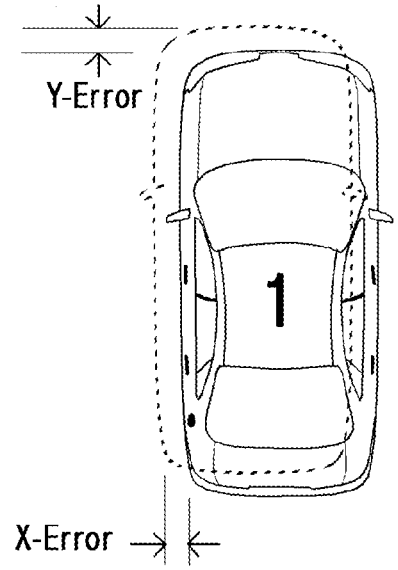

FIGS. 8A and 8B shows an overview of how location consensus works. In 8A, relative to vehicle 1, vehicle 2 has both an X-Error and a Y-Error. By comparing the difference in the broadcast location by vehicle 2 with the actual separation (as determined by using sensors on vehicle 1), the relative position of vehicle 2 to vehicle 1, the effective error in the position reference being used by vehicle 2 can be determined. This error is averaged for the consensus set of such determinable vehicles, including the host vehicle (vehicle 1), and this new average value is added to the host's positions as broadcast. Other vehicles in the consensus set execute the same averaging algorithm, with the result that all vehicles in the consensus set (here, vehicles 1 and 2) adjust their broadcast positions so that the relative positions of the vehicles match or is close to the actual separations, as determined by those of the vehicles' local sensors. This result is shown in FIG. 8B. The solid lines show the actual vehicle locations, and the dotted lines show the as-broadcast locations. In FIG. 8B, the difference between the solid-lined vehicles (actual) and the dotted-lined vehicles (as broadcast) are the same.

FIG. 9 shows an embodiment of a block diagram of a V2V transponder, 90. 91 is the radio, which can send and receive in authorized V2V bands and modulations. 92 is non-volatile memory to hold lane records, road history, firmware, and the like. 93 is working memory, such as RAM. 95 is a CPU, processor, or a plurality of processors, include DSPs, for example. 96 is a time base, which may comprise a ovenized or temperature compensated crystal oscillator with an accuracy of 0.5 to 10 parts in $10^{13}$ per day, and accepts GPS or other satellite time as an input. 94 shows many input output capabilities, such as vehicle operation data (such as speed, heading, state of controls, braking, lights, etc.), sonar, radar and video for determining the relative position, heading and speed of nearby vehicles for location and elevation consensus, video or still image input for security and road documentation, and GPS or another satellite system for course location and timing. This list is not exhaustive. A gateway, 97, may provide connectivity to other networks, such as WiFi, cellular phone and cellular data, Bluetooth, and the like. 98 is the V2V radio antenna.

FIG. 10 shows one embodiment of a weighted time slot selection function. The vertical axis, 100, is the chance of selecting a given entry in a sorted table of available time slots. The table entries are on the horizontal axis, 105. The chance of selection may be continuous, positive real numbers less than one; the sorted time slot table entries are discreet, although discreet values are not shown in this Figure. 101 shows an area where the probability is constant. Typically it is constant up to a knee, 102, where the knee is at the point where the number of available time slots is at a predetermined minimum. The slope, 103, is monotonic but not necessarily linear, as shown here. The point 104 marks the available last time slot in the table, which is the size of the current priority class region, if this curve is for that region. The area under the curve, 106 should be one, although minor differences from one are tolerable. In some embodiments, knee 102 may be on the left axis or over point 104.

For short V2V message, the overhead of individual transmissions is considerable. Therefore, the overhead should be minimized. One such overhead is the guard time between messages. The purpose of the guard time is to prevent time-of-flight from causing two messages in two adjacent time slots from overlapping. The time-of-flight is the maximum operating distance of a range set divided by the speed of light. Appropriate operating distance in the range of 10 meters to 10 km. An ideal maximum operating range for the priority class region is 1 km, with 5 km being ideal for non-priority and emergency class regions. Time of flight for 1 km is 3.34 μs. If the maximum allowable time base error for a transponder is 0.250 μs, then 3.34+2*(0.25)=3.84 μs is the minimum guard time for a 1 km maximum operating range.

A range set for a first vehicle is a set of vehicles that are communicating with a first vehicle at any given time. The range set for the vehicles in a range set is typically not the same. Thus, range sets "overlap."

The primary purpose of priority class messages is to avoid or mitigate collisions. Thus, the effective range for the priority class need not be far. Purposes for the non-priority class and the emergency class regions vary. The non-priority class region may be used for travel information, toll and parking fee collection, data-base sharing (such as street history and lane maps), courtesy messages (such as, "your tail lights are out"), message forwarding, parking information, event information, traffic signal communication and optimization, traffic flow optimization, emergency management, and the like. Thus, a longer maximum operating range is appropriate, such as 1 km to 100 km. One such range is 5 km. Thus, the inter-transmission guard time may vary between class regions. The inter-transmission guard time may be fixed or dynamic. Consensus may be used to arrive at an agreed dynamic maximum range for a range set.

A weighted random algorithm or formula for new self-assigned time slot selection is crucial to an embodiment. Since the size of the priority class region varies with demand, it is important that the in-use time slots minimize this region during periods of low demand so as to keep the non-priority region as large as possible. However, to keep the probability of a series of message collisions for a transponder (during which the transponder's messages are not being received) as low as possible, a reasonable number, such as 10 to 250, or 100, of time slots must be available. The weighted random algorithm solves this problem.

In addition, we want to keep the frequency of new time slot selection as low as possible, to minimize the chances of two transponders selecting the same new time slot at the same time. If only one new time slot is being selected in a frame time, the transponder will always select an available empty time slot. If two transponders select new time slots during the same frame time, the chance of a message collision due to selecting the time slot is computable. If there are 100 available time slots, and the weighting is constant, the odds of message collision from this cause is approximately one in 100^2, or 0.01% chance. The odds of two consecutive message collisions in this scenario is approximately one in 100^4, or 0.000001%.

The process for selecting a new time slot is summarized: First, determine the size of the desired class region. Second, find all available timeslots in the desired class region. Available time slots are empty, and there may be other restrictions. Third, created a numbered list containing the available time slots. Fourth, select the parameters of the weighting formula to match the size of the list and other criteria, such as any minimums and maximums. Fifth, select an appropriate random number and execute the selected formula with the selected parameters. This will provide the number of the list entry. Finally, use the list to determine the actual time slot number selected. An appropriate formula is w=[exp(−n/k]]/(k−1), where w is the statistical weight, for each n, where n is the list entry and k is a selectable parameter. For 20 available time slots, k might be 6. Some formulas may provide a list entry or time slot outside of usable bounds. In this case, the formula is run again. An alternate formula is that the statistical weighting for first p time slots, where p is in the range of 10 to 250, such as 100, is constant, then the statistical weighting decreases from p to the end of the list decreases linearly such that the total probability of selecting one entry in the list is 100%. P may be same as the minimum number of available time slots in the priority or emergency class region. In this case, the statistical weighting is flat if the class region is at its minimum size.

Yet another alternative statistical weighting formula, for linear weighting, is TS=INT(M*ABS(RAND( )RAND( )−1)+1), where M is the maximum number of available time slots and the functions have the usual Microsoft® Excel® (Microsoft® Office® 2010) definitions. TS is the list entry. The result of the inner formula is rounded to an integer starting at one and the corresponding available time slot list entry, TS, is then selected. Weighting functions should be monotonic, for operational predictability.

The definition of an "empty" time slot includes treating any slot with an excessive amount of noise or slot that is reserved as non-empty. A slot may be treated as empty only if it is empty for n immediately prior frames, where n is in the range of 1 to 10. Good choices for n are 1 or 2.

All transponders participate in identifying message collisions, including the transmitting transponder. Those trained in the art know there are multiple ways of detecting a message collision, such as high signal strength with an invalid preamble, FCS or modulation; or the signal/noise ratio in a given time slot suddenly increasing. A message collision notification message is typically broadcast in the transponder's priority class region time slot. However, it may be transmitted in the non-priority class region. Also, a transponder may select a new, second time slot for the purpose of sending a message collision notification message, however this is normally done only if it appears that the first such message or messages were not received by at least one of the sources of the message collision. Message collision notifications should be sent as soon as possible when a message collision is detected. In an alternative embodiment, two consecutive message collisions must be detected before a message collision notification message is sent. This alternative allows at least one of the sources of the message collision to self-detect the collision and select a new time slot without using up any bandwidth for message collision notifications.

When a transponder detects a message collision is also listens for any message collision notification messages, which may be broadcast, prior to its own planned broadcast. When it detects one or more such equivalent message collision notifications, it does not send any additional, and thus duplicate message. However, it is important that message collisions are recognized by the participants in the message collision rapidly. Therefore, an appropriate number of message collision notifications is often more than one. An appropriate number of such similar notifications is in the range of 1 to 5, where 2 is a good choice.

There are two ways to identify the sources of a message collision. The first method is by the time slot number. The second method is by identifying at least one of the vehicles. The vehicle identification is the position of the vehicle. The result of the first method is that typically both participants will receive the message collision notification and both will immediately select a new time slot. However, sometimes only one vehicle will receive the message collision notification and thus only that transponder will select a new time slot, which solves the message collision. The result of the second method is that if only one vehicle is identified, then only one vehicle selects a new time slot, which minimizes the chance that the newly selected time slot will also result in another message collision.

Selection of a new time slot not due to a message collision should be infrequent enough to reduce the chance of such a new time slot selection producing a message collision in that time slot below a threshold, yet frequent enough to keep the size of the priority and emergency class regions as small as reasonable, subject to the constraints of the embodiment. Such a constraint may be a minimum likelihood of having a message collision in the newly selected time slot, such as below 10%, below 5%, below 1%, below 0.5%, below 0.1%, or below 0.05% probability. The constraints for selecting a new time slot based on a current message collision compared to selecting a new time slot for a different reason, may be different or the same. The constraint may be responsive to current risk or to message priority. The constraint may alter the new time slot selection function. For example, the range of available time slots in a class region may be expanded or reduced to meet the constraint. As another example, the shape of the function may be altered, such as from exponential to linear, or from linear to flat.

Vehicle location is always the location of the vehicle (the vehicle's reference point) at the end of the frame in which the message comprising the location is sent. (In some embodiment, another fixed time relative to the same frame.) Thus, for a moving vehicle, the vehicle position and thus the vehicle identification in a message changes with each frame. The vehicle position need only be within an allowable error for the vehicle to be clearly and consistently identified. One such method uses the "closest vehicle" (closest reference point on the vehicles) to the position in the message. Another message uses a maximum allowable distance, which may vary with vehicle speed, or other factors. A range of such allowable distance is 100 cm to 10 meters, with 1 or 2 meters being a good choice.

MAC and IP addresses are defined the relevant IEEE standards and by the relevant Internet RFPs.

Messages are broadcast in cleartext without any MAC or IP addresses, as they take up too much bandwidth and have no value in a V2V application. Eliminating MAC and IP addresses also eliminates the need for a central authority to assign and monitor their usage.

Hacking may be detected by comparing the claimed location of a vehicle with visible observation (such as machine vision) otherwise detectable (such as the use of sonar, radar or LIDAR) location. Hacking may also be detected by noticing that the time of flight of the message is inconsistent with the claimed location, for a non-proxied transmission. Hacking may be mitigated by taking photographs, and asking other vehicles to take photographs of the suspected hacking source. Hacking may also be mitigated by sending hacking warning messages, which are forwarded by other transponders, to an appropriate authority, or transmitted out of band, such as via cellular networks. Also hacking warning messages may be used to caution other vehicles against taking any risk or unusual behavior as a result of bad information. Potential hacking data be stored, and optionally signed with a PKI certificate, for use in prosecution.

Sometimes it is desirable for a vehicle to identify itself with a pre-assigned, permanent identification, such a license plate, VIN number, IP address, emergency vehicle ID, or cell phone or serial number. Such a non-priority linking message may be transmitted when needed, or periodically, using the non-priority class region, and using a time slot number or vehicle location to link the pre-assigned ID to the vehicle's messages. An appropriate frequency of such ID linking messages is 1 to 30 seconds, with 5 seconds being a good choice.

It is desirable that all vehicles in a range set have a common time base with a minimum amount of error. An internal clock or GPS-derived clock may not be adequate for this purpose. In one embodiment consensus is used to arrive at a (nearly) common time base for a consensus set. Each time slot message should begin at precisely the start of its time slot. Time-of-flight may be corrected because the transmitter's location is usually known. Thus, each receiver can compute the apparent time base error for all valid TDMA messages received. Each receiver may then average all such apparent time base errors, including its own baseline time base (which may be weighted to count as more than one in the averaging), and shift its "as transmitted" time base by that, consensus based error. Since each transponder includes its own reference time base (which may be a combination of GPS or other satellite system derived time base and a precision internal clock) in the averaging, the consensus time base will also converge towards the average of all internal time bases in the range set. Since ranges sets typically overlap, the time base error or offset "as transmitted" by each vehicle is likely to be very slightly different. Invalid messages, and messages where the vehicle location or time-of-flight cannot be accurately determined are not used in the averaging process. Messages with an excessive amount of apparent time base error are considered invalid for this purpose. Ideally, the time base correction is performed at the end of every frame, although it may be performed on a different schedule, or only under certain conditions. Time base correction should limited to a maximum rate of change. A transponder without a sufficiently accurate internal clock should not transmit, although listening is typically still valuable. A suitable accuracy is in the range of 1 ns to 4 µs, with 0.250 µs being a good desired minimum accuracy. If the time base is going to be used to compute distance, then a desired accuracy is in the range of 0.1 to 2 ns, with 0.3 ns being a good choice.

The meaning of the term "message" includes "sub-message." A "consensus group" is a group of transponders participating in a convergent algorithm using the V2V messages of embodiments of this invention.

Suitable buffer zone sizes may be 10, 20, 50, 100, 125, 150, 200, 250, or 300 time slots. Suitable buffer zone sizes are 10%, 15%, 20%, 40%, 50%, 75%, 100%, or 200% of a current priority or emergency class region size. Buffer zone sizes may be a combination of a numerical time slot count and a percentage of an class region size, such as the larger of 50 time slots or 50% of current class region size, subject the limit of all time slots. Buffer zone size may be fixed or variable.

Embodiments and possible limitations include: A minimum number of time slots of 50, 100, 150, 200, 250, 500, 1000, 2000; A minimum number of time slots for vehicle safety messages comprising (i) vehicle position, (ii) vehicle speed, and (iii) vehicle heading are 15, 50, 100, 150, 200, 250, 500, 1000, or 2000; A minimum number of time slots for vehicle safety messages comprising (i) vehicle position, (ii) vehicle speed, (iii) vehicle heading, and (iv) vehicle identification suitable for V2V potential collision warnings are 15, 50, 100, 150, 200, 250, 500, 1000, or 2000; A minimum number of time slots for vehicle safety messages dedicated to being transmitted by a combination of emergency vehicles and government authorized road-side units are 10, 25, 50, 100, 150, 200, 250, or 500; A maximum time for the basic time interval is 2, 1, 0.5, 0.25, 0.1, 0.05, or 0.01 seconds; A minimum transmit rate for V2V safety messages or messages suitable for V2V potential collision warnings is 1, 2, 5, 7.5, 10, 15, or 20 times per second; A maximum message length for data, exclusive of: wireless header, preamble, signal field, frame check sum, and inter-transmission guard time is 114 bits, 282 bits, 36 bytes, 50 bytes, 75 bytes, 100 bytes, 150 bytes, 200 bytes, 250 bytes; A maximum message length for data, exclusive of: wireless header, preamble, signal field, frame check sum, and inter-transmission guard time but inclusive of any MAC or IPS address, if any, is 114 bits, 282 bits, 36 bytes, 50 bytes, 75 bytes, 100 bytes, 150 bytes, 200 bytes, 250 bytes; A maximum time of an inter-transmission guard time of 1, 2, 3, 4, 5, 7.5 10, 15, 20, 25, 50 microseconds; An inter-transmission guard time computed by maximum intended range of single-hop V2V communications divided by the speed of light, plus two times the allowable common time base error; A maximum intended range of single-hop V2V communications of 50, 100, 250, 500, 750, 1000, 1500, 2000, 2500, 5000, or 10000 meters; A minimum number of vehicles that may simultaneously use a V2V communications system with 90%, 95%, 99%, 99.5%, 99.9% or 99.99% reliability is 10, 25, 50, 75, 100, 150, 200, 250, 350, 500, 750, or 1000; A minimum number of time slots reserved for land vehicle use; A transceiver, for each subject vehicle, transmits a vehicle safety message or a V2V message suitable for collision prevention no more than once per basic time interval, in at least 90% of all basic time intervals; Each non-forwarded safety message comprising a subject vehicle position is unique for the basic time interval in which it is broadcast; Each safety message is updated for each basic time interval in which it is broadcast; Each safety message comprises data that is to be interpreted as valid precisely at the end of the basic time interval in which it is broadcast; V2V system incorporating transponders of this invention are free of road-side units (RSU's); V2V system incorporating transponders of this invention are free of the necessity for any fixed infrastructure, such as servers, cell towers, or RSUs; All time slots are available for use by mobile transponders. Such limitations or features of this paragraph may be in any combination. A preferred embodiment is a basic time interval of 0.1 seconds comprising 1000 time slots with an intended range of 1000 meters comprising V2V safety messages of 114 data bits and 282 data bits, supporting a minimum number of time slots reserved for a combination of emergency vehicle and government provided RSU use.

A functioning V2V system requires at least two transponders. Because of proxying, such a V2V system using the transponders of these embodiments is effective with as little as 10% penetration. Penetration is the percent of vehicles in a defined region or class that are equipped. A "subject vehicle" is the vehicle whose data is in a message. The "host vehicle" is the vehicle in which the transponder is located. Proxying is when the subject vehicle is not the host vehicle.

The embodiments and scenarios are described herein are non-limiting. As those trained in the art appreciate, there are many alternative and equivalent embodiments of this invention. Small variations from absolutes, constants, and limits, such as "all," "always," or "one," that have a minimal effect on the purpose of the invention, are within the scope of the claims. A "minimal effect" may be defined as one that reduces the desired effectiveness by 5% or less.

Applications to which this application claims priority are incorporated herein. The terms "position" and "location" may be used interchangeably. Embodiments of this invention include all possible combinations of all limitations, options, features, and ranges disclosed herein, including in the claims and drawings.

What is claimed is:

1. A vehicle-to-vehicle (V2V) communication transponder:
    wherein in the transponder comprises a processor and memory;
    wherein the transponder is adapted to operate in a first vehicle;
    wherein the transponder is adapted to accept as input a subject vehicle position and a subject vehicle heading, and wherein the transponder is adapted to transmit V2V safety messages comprising: (i) the subject vehicle position; (ii) the subject vehicle heading; and (iii) a subject vehicle speed;
    the transponder uses a basic time interval ("frame") of predetermined duration wherein the frame repeats continuously;
    wherein the frame comprises n time slots of predetermined duration, enumerated and contiguous;
    wherein the frame is subdivided into a priority class region comprising contiguous time slots from a first time slot S1 to a last time slot S2; and a non-priority class region comprising contiguous time slots from a first time slot S3 to a last time slot S4;
    wherein the range S1 to S2 and the range S3 to S4 do not overlap;
    wherein the transponder transmits only time-critical V2V safety messages in the priority class region;
    wherein the transponder broadcasts a V2V safety message in a self-selected time slot in the priority class region in every frame;
    wherein the self-selected time slot is the same time slot for every frame until a new time slot is self-selected by the transponder;
    wherein the transponder manages message broadcasts in the non-priority class region using Carrier Sense Multiple Access protocol.

2. The vehicle-to-vehicle (V2V) communication transponder of claim 1 wherein:
    the size of the priority class region, defined by the number S2–S1+1, is adjusted after each frame responsive to the number of empty priority class region time slots in the prior frame; and
    wherein the size of the non-priority class region, defined by the number S4–S3+1, is adjusted after each frame by an equal and opposite number of frames in the priority class region, such that the sum of the sizes of the priority and non-priority class regions remains constant.

3. The vehicle-to-vehicle (V2V) communication transponder of claim 1 wherein:
    the size of the priority class region, defined by the number S2–S1+1, is adjusted after each frame to the larger of: (i) S2=SX where SX is the highest number non-empty time slot with a priority class transmission, and (ii) a size such that the number of empty time slots in the priority class region is a predetermined number.

4. The vehicle-to-vehicle (V2V) communication transponder of claim 1 wherein:
    the frame is further subdivided into an emergency class region comprising contiguous time slots from a first time slot S5 to a last time slot S6 and the range S5 to S6 does not overlap with either the range S1 to S2 or the range S3 to S4;
    wherein the emergency class region is restricted to messages transmitted from emergency vehicles or from government authorized road-side units (RSUs);
    wherein when a transponder broadcasts a V2V safety message in the emergency class region it uses one self-selected emergency time slot in every frame;
    wherein the self-selected emergency time slot is the same time slot for every frame until a new self-selected emergency time slot is self-selected by the transponder or the transponder stops sending messages in the emergency class region.

5. The vehicle-to-vehicle (V2V) communication transponder of claim 4 wherein:
the size of the priority class region, defined by the number S2−S1+1, is adjusted after each frame responsive to the number of empty priority class region time slots in the prior frame; and
the size of the emergency class region, defined by the number S6−S5+1, is adjusted after each frame responsive to the number of empty emergency class time slots in the prior frame;
wherein the size of the non-priority class region, defined by the number S4−S3+1, is adjusted after each frame, such that the sum of the sizes of the priority, emergency non-priority class regions, and any buffer regions, remains constant.

6. The vehicle-to-vehicle (V2V) communication transponder of claim 1 wherein:
the wireless encoding method, for a particular message broadcast in the priority class region, is responsive to the amount of data in the particular message such that the time length of the particular message is equal to or less than the available transmission time within one time slot.

7. The vehicle-to-vehicle (V2V) communication transponder of claim 1 wherein:
an inter-transmission guard time between transmissions in the priority class region is no longer than the intended operating distance of a V2V communication system using the transponder, for messages in the priority class region, divided by the speed of light; plus two times the allowable time base error of the transponder.

8. The vehicle-to-vehicle (V2V) communication transponder of claim 1 wherein:
an inter-transmission guard time between transmissions in the priority class region is shorter than an inter-transmission guard time between transmissions in a different priority class region.

9. The vehicle-to-vehicle (V2V) communication transponder of claim 1 wherein:
the self-selected time slot is randomly selected from a set of time slots that were empty in at least the immediately prior frame and within the currently determined class region;
subject to a monotonic, statistical weighting function such that the probability of selecting a first time slot T1 is equal to or higher than the probability of selecting a second time slot T2 wherein T1 is closer to S1 than is T2, and that at least for some T1 and T2, the probability of selecting T1 is higher than the probability of selecting T2.

10. The vehicle-to-vehicle (V2V) communication transponder of claim 1 wherein:
the transponder self-selects a new time slot when: (i) a time slot holding timer expires, and (ii) the current time slot is not a time slot that might be self-selected by the transceiver for the current frame, if it were empty.

11. The vehicle-to-vehicle (V2V) communication transponder of claim 1 wherein:
the transponder self-selects a new time slot when it receives a message collision message identifying either: (i) the subject vehicle for which the transponder is sending messages, or (ii) the time slot in which the transponder is sending messages.

12. The vehicle-to-vehicle (V2V) communication transponder of claim 1 wherein:
the transponder is adapted to detect a "message collision," that is, when two or more messages sent by transponders within receive range of the transponder transmit in the same time slot;
wherein the transponder transmits a "message collision message" in response to the detection of a message collision wherein the message collision message identifies either (i) a vehicle location for a subject vehicle whose location was in one of the colliding messages; or (ii) the time slot of the message collision;
subject to the exclusion wherein the transponder does not send a message collision message if the transponder has received a predetermined minimum quantity of message collision messages identifying the same message collision as the message collision message it would have sent.

13. The vehicle-to-vehicle (V2V) communication transponder of claim 1 wherein:
the only vehicle identification in a V2V safety message is the subject vehicle position.

14. The vehicle-to-vehicle (V2V) communication transponder of claim 1 wherein:
V2V safety messages are sent in cleartext; and
wherein the vehicle safety messages are free of MAC addresses and free of IP addresses.

15. The vehicle-to-vehicle (V2V) communication transponder of claim 1 wherein:
the timing of valid messages received in the priority class region are used by the transponder to adjust the transponder's time base so as to create a dynamic, continually updated, consensus-group time base wherein the consensus group comprises vehicles sending and receiving valid messages in the priority class; and
wherein the validity of such messages is determined, at least in part, by the transponder having a distance metric, between the sending and receiving transponders, within a predetermined accuracy.

16. A vehicle-to-vehicle (V2V) communication system using a plurality of vehicles, each equipped with a transponder of claim 1.

17. A vehicle equipped with a transponder of claim 1 wherein the subject vehicle is the equipped vehicle.

* * * * *